United States Patent
Borchersen et al.

(10) Patent No.: US 11,832,595 B2
(45) Date of Patent: *Dec. 5, 2023

(54) SYSTEM AND METHOD FOR IDENTIFICATION OF INDIVIDUAL ANIMALS BASED ON IMAGES OF THE BACK

(71) Applicant: VIKING GENETICS FMBA, Randers SO (DK)

(72) Inventors: Soren Borchersen, Horsens (DK); Claus Borggaard, Viby Sj (DK); Niels Worsoe Hansen, Lejre (DK)

(73) Assignee: Viking Genetics FmbA, Randers SO (DK)

(*) Notice: Subject to any disclaimer, the term of this patent is extended or adjusted under 35 U.S.C. 154(b) by 90 days.

This patent is subject to a terminal disclaimer.

(21) Appl. No.: 17/343,208

(22) Filed: Jun. 9, 2021

(65) Prior Publication Data

US 2021/0406530 A1 Dec. 30, 2021

Related U.S. Application Data

(63) Continuation of application No. 15/738,823, filed as application No. PCT/EP2016/065241 on Jun. 30, 2016, now Pat. No. 11,080,522.

(30) Foreign Application Priority Data

Jul. 1, 2015 (EP) .................................. 15174783

(51) Int. Cl.
*G06T 7/62* (2017.01)
*A01K 5/02* (2006.01)
(Continued)

(52) U.S. Cl.
CPC ............... *A01K 5/02* (2013.01); *A01K 11/00* (2013.01); *A01K 29/00* (2013.01); *G06T 7/62* (2017.01);
(Continued)

(58) Field of Classification Search
None
See application file for complete search history.

(56) References Cited

U.S. PATENT DOCUMENTS

| 4,881,953 A | 11/1989 | Prasad et al. |
| 5,249,709 A | 10/1993 | Duckworth et al. |

(Continued)

FOREIGN PATENT DOCUMENTS

| CA | 2925275 A1 | 11/2014 |
| DE | 4420254 A1 | 1/1995 |

(Continued)

OTHER PUBLICATIONS

A. Finch. "Machine vision classification of animals" Mechatronics and Machine Vision 2003: Future Trends, ISBN 0863802907, 2003 (Year: 2003).

(Continued)

*Primary Examiner* — Oneal R Mistry
(74) *Attorney, Agent, or Firm* — BakerHostetler

(57) ABSTRACT

The present disclosure relates to a system and a method for identification of individual animals based on images, such as 3D-images, of the animals, especially of cattle and cows. When animals live in areas or enclosures where they freely move around, it can be complicated to identify the individual animal. The present disclosure relates to a method for determining the identity of an individual animal in a population of animals with known identity, the method comprising the steps of acquiring at least one image of the back of a preselected animal, extracting data from said at least one (Continued)

image relating to the anatomy of the back and/or topology of the back of the preselected animal, and comparing and/or matching said extracted data against reference data corresponding to the anatomy of the back and/or topology of the back of the animals with known identity, thereby identifying the preselected animal.

24 Claims, 7 Drawing Sheets

(51) Int. Cl.
  *A01K 11/00* (2006.01)
  *A01K 29/00* (2006.01)
  *G06V 40/10* (2022.01)
  *G06V 10/46* (2022.01)
  *G06V 20/64* (2022.01)

(52) U.S. Cl.
  CPC ............ *G06V 10/46* (2022.01); *G06V 20/64* (2022.01); *G06V 40/10* (2022.01); *G06V 40/103* (2022.01); *G06T 2207/10028* (2013.01)

(56) References Cited

U.S. PATENT DOCUMENTS

| | | | |
|---|---|---|---|
| 5,412,420 | A | 5/1995 | Ellis |
| 7,497,894 | B2 | 3/2009 | Jeffers et al. |
| 7,517,388 | B2 | 4/2009 | Jensvold |
| 7,578,871 | B2 | 8/2009 | Jensvold |
| 7,662,333 | B2 | 2/2010 | Coan et al. |
| 9,142,028 | B2 | 9/2015 | Banhazi et al. |
| 10,027,179 | B1 | 7/2018 | Bello et al. |
| 10,430,942 | B2 | 10/2019 | Barrett et al. |
| 2004/0103847 | A1 | 6/2004 | Larsen |
| 2004/0141636 | A1* | 7/2004 | Liang ............ G06T 7/20 382/110 |
| 2005/0257748 | A1 | 11/2005 | Kriesel et al. |
| 2006/0008150 | A1 | 1/2006 | Zhao et al. |
| 2009/0074253 | A1 | 3/2009 | Peacock et al. |
| 2010/0199915 | A1 | 8/2010 | Pettersson et al. |
| 2010/0246970 | A1 | 9/2010 | Springer et al. |
| 2011/0126770 | A1 | 6/2011 | Mulder et al. |
| 2015/0114995 | A1 | 4/2015 | Disiro et al. |
| 2016/0125276 | A1* | 5/2016 | Spicola, Sr. ............ G06T 7/90 382/110 |
| 2016/0259970 | A1* | 9/2016 | Wee ............ G06V 40/171 |

FOREIGN PATENT DOCUMENTS

| | | |
|---|---|---|
| EP | 1396188 A2 | 3/2004 |
| EP | 2027770 A2 | 2/2009 |
| EP | 2260699 A2 | 12/2010 |
| EP | 3029603 A2 | 6/2016 |
| EP | 3316680 | 5/2018 |
| JP | 2003-247805 A | 9/2003 |
| JP | 2011-177116 A | 9/2011 |
| JP | 2012-205555 A | 10/2012 |
| KR | 10-2016-0044835 A | 4/2016 |
| WO | 95/28807 A1 | 10/1995 |
| WO | 01/17340 A1 | 3/2001 |
| WO | 01/64029 A1 | 9/2001 |
| WO | 2004/044829 A1 | 5/2004 |
| WO | 2010/063527 A1 | 6/2010 |
| WO | 2014/083433 A2 | 6/2014 |
| WO | 2014/166498 A1 | 10/2014 |
| WO | 2014/189250 A2 | 11/2014 |
| WO | 2014/197631 A1 | 12/2014 |
| WO | 2015/156833 A1 | 10/2015 |

OTHER PUBLICATIONS

Awad A.I. et al., "A Cattle Identification Approach Using Live Captured Muzzle Print Images", In Awad A.I et al Advances in Security of Information and Communication Networks. SecNet 2013, Communications in Computer and Information Science, vol. 381, Springer, Berlin, Heidelberg.

Ahmet Cumhur Arslan et al.: "3D Cow identification in Cattle Farms", 2014 IEEE 22nd Signal Processing and Communications Applications Conference (SIU 2014).

Arslan, et al: "3D cow identification in cattle farms," 2014 22nd Signal Processing and Communications Applications Conference (SIU), Trabzon, 2014, pp. 1347-1350.

Bewley, et al: "Potential for Estimation of Body Condition Scores in Dairy Cattle from Digital Images", Journal of Dairy Science, vol. 91, Issue 9, 2008, pp. 3439-3453.

Fioretti et al (NPL "A new Tool for Beef performance recording in Italy", 2012) (Year: 2012).

International Search Report and Written Opinion dated Oct. 21, 2016 issued in International Patent Application No. PCT/EP2016/065241.

Kuhl: et al: Tilo Burghardt,"Animal biometrics: quantifying and detecting phenotypic appearance", Trends in Ecology & Evolution, vol. 28, Issue 7, 2013, pp. 432-441.

Martinez-Ortiz, C, Everson, R and Mottram, T2013. "Video tracking of dairy cows for assessing mobility scores". In Proceedings of the 6th European Conference on Precision Livestock Farming, Sep. 2013, Leuven, Belgium, pp. 154-162.

Mohammadamin Kashiha at al, "Automatic identification of marked pigs in a pen using image pattern recognition", Computers and Electronics in Agriculture, vol. 93, 2013, pp. 111-120.

PCT Direct letter filed by the proprietor on Jun. 30, 2016 as part of the PCT patent application.

Viazzi, et al: "Comparison of a threedimensional and two-dimensional camera system for automated measurement of back posture in dairy cows", Computers and Electronics in Agriculture, vol. 100, 2014, pp. 139-147.

Wikipedia, "Biometrics" Jun. 13, 2015, [cited May 12, 2020] Available from: [https://en.wikipedia.org/w/index.php?title=Biometrics&oldid=666760328].

Wikipedia, "Facial recognition system" Jun. 11, 2015, [cited May 12, 2020] Available from: [https://en.wikipedia.org/w/index.php?title=Facial_recognition_system&oldid=66 6464426].

Wikipedia, "Layers (digital image editing)" May 15, 2015, [cited May 12, 2020] Available from: [https://en.wikipedia.org/w/index.php?title=Layers_(digital_image_editing)&oldid =662466468].

U.S. Appl. No. 15/738,823, filed Dec. 21, 2022.

* cited by examiner

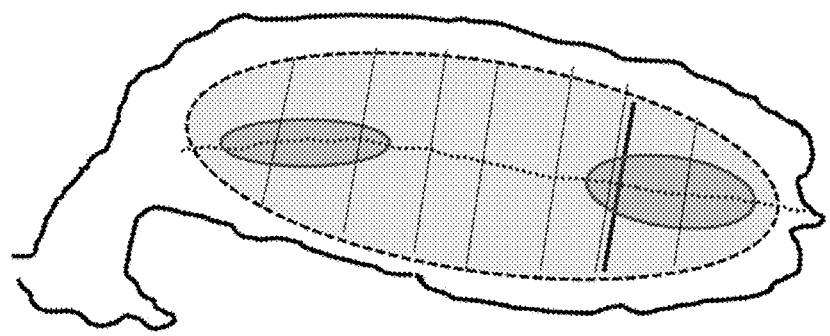
Fig. 3
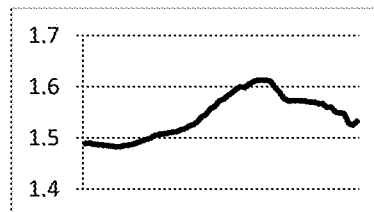 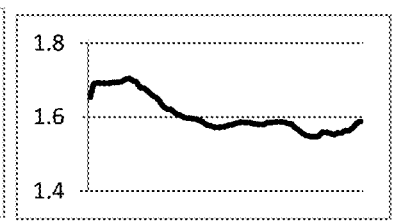
Fig. 4A  Fig. 4B
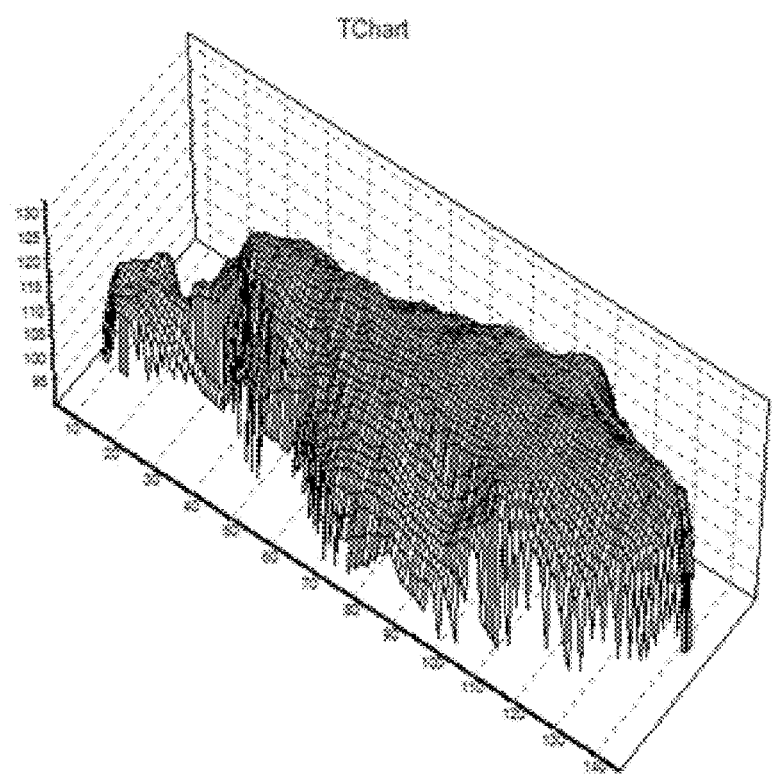
Fig 5

SYSTEM AND METHOD FOR IDENTIFICATION OF INDIVIDUAL ANIMALS BASED ON IMAGES OF THE BACK

CROSS REFERENCE TO RELATED APPLICATIONS

This application is a continuation of U.S. application Ser. No. 15/738,823, filed Dec. 21, 2017, which is the National Stage of PCT/EP2016/065241, filed Jun. 30, 2016, which claims the benefit of European Application Number 15174783.9, filed Jul. 1, 2015, the disclosures of which are incorporated herein by reference in their entireties.

The present disclosure relates to a system and a method for identification of individual animals based on images, such as 3D-images, of the animals, especially of cattle and cows.

BACKGROUND OF INVENTION

Identification of individuals of livestock animals such as pigs, cattle and cows is usually performed by systems such as non-electronic identification tags e.g. ear notching, ear tags, number tags in neck chains and electronic identification where the most common include electronic ear tags, microchips, and electronic collars. Each of these systems has advantages and drawbacks and the systems cannot be used solely for identification of individuals in groups with simultaneously automatic collection of other information relevant for the individual animal.

When producing milk from cows up to 80% of the expenses are used for feed to the cows. Optimization of the feed intake relative to the milk production and the health of the cow may reduce the expenses not only used for feed but also for medicine or veterinarian support. Cow health and wellness can be increased by having the cows in loose-housing system where the cows can move around and thus strengthen the bones and muscles. In these loose-housing system it can be difficult to determine the feed intake for each cow as an estimation of feed intake must be correlated to the individual cow.

WO 95/28807 ('Three-dimensional phenotypic measuring system for animals', Pheno Imaging Inc.) describes a three-dimensional phenotypic measuring system for animals such as dairy cows. The system uses a large number of modulated laser light beams from a laser camera to measure approximately 100 points per square inch of the animal. Each laser beam measures intensity, horizontal, vertical, and depth dimensions, and by combining the measurements, the system composes a very accurate three-dimensional image of the animal. The system calculates the desired phenotypic measurements for conformation of the animal by combining measurements of selected points on the animal. The system then stores the measurements for each animal in a computer data base for later use. The system also stores a light intensity image of the animal's markings which is compared to other stored images. The system makes pictures of side views of the animals and is used for grading the animals. The system can scan the data bank for each new animal to ensure that the same animal is not processed more than once.

EP 2027770 ('Method and apparatus for the automatic grading of condition of livestock', Icerobotics Limited) describes a method of and apparatus for grading a characteristic of an animal. The animal is guided to a detection area whereupon an image of the back of the animal is captured. The identity of the animal is furthermore established when the animal is in the detection area. The identity is determined by means of reading an identification mark located on the animal. Analysis of the image identifies anatomical points and determines angles at these points. The angles are then used to calculate a grading for a characteristic of the animal. An embodiment is presented for automating the determination of body score condition in dairy cows using seven angles determined at three anatomical points from an image over the back of the cow.

Hence, identification of an individual animal is easy if it is possible to have access to the identification mark which is attached to each animal. But many animals live in a loose-housing system where access to each animal's identification mark is not possible at any given time. Further, the animals may be located in an open-air field. In both situations it is impossible to monitor each individual animal if the identification mark cannot be accessed.

SUMMARY OF INVENTION

If an individual animal in a loose-housing system cannot be monitored constantly or frequently it is virtually impossible to register the feed intake of each animal. The presently disclosed invention therefore relates to a method for determining the identity of an individual animal from the natural appearance and/or topology of the back of the animal. The present inventors have realized that each animal has unique characteristics associated with the natural configuration, appearance, topology and/or contours of the back of the animal. The inventors have furthermore realized that these characteristics can be extracted from one or more images showing at least a part of the back of an animal. The fortunate result is that animals can be identified from an image of the back of said animal if a previous, and preferably substantially recent image, exists of the same animal, by comparing these images, such as by extracting corresponding features of the images that can be compared. By using images of the back of the animals makes it possible to identify and monitor animals from above, e.g. based on camera systems mounted in the ceiling of a barn/stable or from an airborne camera system, e.g. airborne by means of a drone. Airborne camera systems can furthermore be applied for identifying and monitoring animals in an open-air field.

In one embodiment the presently disclosed method therefore comprises the steps of:
  Obtaining at least one image of at least a part of the back of an animal, e.g. an un-identified animal, and
  Extracting data from the at least one obtained image, the extracted data, e.g. predefined characteristics, relating to the natural appearance, anatomy, contour and/or topology of the back of the animal.

When the image(s) has been analyzed and extracted data thereby obtained the animal can be identified if e.g. predefined characteristics in the image matches predefined characteristics of a previous (reference) image of the same animal. A correspondence between two or more images of the same animal can therefore be established because the anatomy of the back of an animal is unique to each animal, at least in a herd or population of animals with only a limited number of animals. The previous (reference) image may furthermore be associated with the identity of the animal, e.g. with the identity of the animal corresponding to the identification mark of the animal. Hence, once a correspondence is established between the identity of the animal, e.g. via the identification mark, and one or more predefined anatomic characteristics of the back of the animal, this animal can subsequently be uniquely identified solely by means of images showing (at least a part of) the back of said animal.

In a further embodiment the extracted data is compared with reference data extracted from at least one reference image of a back of an identified animal, where the information of the identity of the identified animal may be connected to the at least one reference image. Further, based on the comparison, it can be determined whether the un-identified animal corresponds to the identified animal. The steps of comparing the extracted data with reference data and determining whether the un-identified animal corresponds to an identified animal, may be repeated for a plurality of reference images of a plurality of identified animals until a match is obtained and the un-identified animal has been identified. The extracted data may also be matched or compared against a database of predefined (anatomical) characteristics, the database e.g. comprising predefined characteristics of each animal in the population or herd of animals that need to be distinguished and a set of predefined characteristics may be associated with exactly one animal of known identity. Once a match between sets of predefined characteristics is obtained the un-identified animal is identified.

The present disclosure further relates to a method for determining the identity of an individual animal in a population of animals with known identity, the method comprising the steps of:
  acquiring at least one image of the back of a preselected animal, and
  extracting data from said at least one image relating to the anatomy, natural appearance and/or topology of the back of the preselected animal, and
  comparing and/or matching said extracted data against reference data corresponding to the anatomy, natural appearance and/or topology of the back of the animals with known identity, thereby identifying the preselected animal.

The system and method as herein disclosed can therefore determine the individual animal based on the anatomy of the back of an animal, whereby it is possible to estimate the intake of e.g. roughage by combining the invention described herein with the system for determining feed consumption as described in e.g. WO 2014/166498 ('System for determining feed consumption of at least one animal', Viking Genetics FMBA) where an image system is used to assess the amount of feed consumed by each identified animal by determining the reduction of feed in subsequent images of the feeding area in front of each identified animal.

With the presently disclosed identification method it might be feasible that animals do not need a visible identification mark because the animals are distinguishable based on the back images. Hence, once images are initially acquired of the back of all animals, they can subsequently be distinguished from each other based on the different images of the back of each animal and thereby identified.

Comparing extracted data from at least one image with extracted data from a previous (reference) image may be performed by any method possible to compare data and may be based on any data directly extracted from the images or from any data calculated on the basis of the images. Vectors may be calculated, scores may be determined such as principal components (PC scores) for a principal component analysis and these may be included in the comparing process and/or used to perform further calculation such as a dot product and the comparing is then performed from the calculated product.

Animals may be any animal species, race or group and may e.g. be selected from the group of cattle, cows, dairy cows, bulls, calves, pigs, sows, boars, castrated males, piglets, horses, sheep, goats, deer.

Reference data may be extracted from at least one (reference) image acquired of the back of each of the animals in the population of animals. A reference image of an animal may be obtained by concurrently determining the identity of the animal by reading an identification marker attached to said animal.

Hence, at least one reference image of the back of an identified animal may for example be obtained by
  providing the identification number of an animal, hereby the animal being an identified animal,
  providing at least one image of the back of the identified animal, and
  storing in a database the identification number of the identified animal together with the at least one image of the back of the identified animal the image hereby being a reference image.

The at least one reference image of the back of an identified animal may be obtained frequently, such as each day, but may be determined due to the type of animals to identify. Relatively short time span of e.g. one or two days may be important when identifying dairy cows.

The method may be based on images and reference images which are topographic images of the back of the animals, such images may be obtained as 3D images.

The present disclosure also relates to an animal identification system for determining the identity of an individual animal among a population of animals with known identity, the system may comprise
  an imaging system configured for acquiring at least one image of the back of a preselected animal, and
  a processing unit configured for
    extracting data from said at least one image relating to the anatomy, natural appearance and/or topology of the back of the preselected animal, and
    matching said extracted data to reference data corresponding to the anatomy, natural appearance and/or topology of the back of each of the animals with known identity, thereby identifying the preselected animal.

The system may further comprise a reference imaging unit for providing one or more reference images of an animal in the population of animals, said reference imaging unit comprising
  at least one identity determining device configured to determine the identity of said animal, such as by reading at least one identification marker attached to said animal, and
  at least one camera configured to acquire at least one (reference) image of the back of said animal.

The system may further be configured to associate the determined identity of the animal with said at least one image acquired by said camera(s) and optionally store said at least one image as a reference image.

Hence, the preselected animal may be seen as un-identified because at the time of image acquisition the system may not know the animal's identity. On the other hand the identity of the preselected animal is not unknown per se, because it has previously been identified and reference data, possibly comprising characteristics of the animal's anatomy, exists such that the preselected animal can be automatically identified shortly after image acquisition. The reference data may be based/extracted from one or more previous images of the preselected animal.

The processing unit may be part of a computing device and images, extracted data, reference images, and/or reference data may be exchanged with a database which may be part of the animal identification system or the system may have access to the database. The imaging system may comprise one or more cameras. The animal identification system may be configured such that at least some of said cameras are arranged such that they are located above the animals to be identified in order to be able to image the back of the animals. The cameras may be in a fixed location but may be configured such that the field of view can be varied in order to image different areas. The presently disclosed animal identification system may also be part of an airborne system as previously indicated.

A further embodiment of the animal identification system relates to a system for determining the identity of an individual animal from the natural appearance and/or topology of the back of said animal, the system may comprise
- at least one camera for obtaining at least one image of the back of an un-identified animal,
- at least one database or admission to at least one database for storing data related to at least one reference image of the back of an identified animal and for storing data related to at least one image of the back of an un-identified animal,
- data transmission means for transmitting data from said at least one camera to said database, and
- at least one processing means connected to said database, said processing means being configured for comparing extracted data from said at least one image from an un-identified animal with extracted data from at least one reference image where said extracted data is related to the natural appearance and/or topology of the back of the animal and based on this comparing determine whether said un-identified animal corresponds to said identified animal.

Preferably the obtained images of the back of the animals are 3D images and which can be obtained by any suitable camera system capable of providing 3D images, such a system may be based on e.g. range cameras, stereo cameras, time-of-flight cameras.

The method and system may be used not only for determining the identity of animals but also for e.g. determining the amount of feed consumed by an animal. Images of feed located in front of an eating animal may be analyzed by similar methods as described herein for animal identification to determine the amount of feed consumption. The invention makes it possible to determine feed consumption of individual animals and store such information in a database, e.g. in connection with that animal's file. Also grading conditions or health conditions may be monitored with the system described herein and such information may also be stored in the animal's file making it possible to follow an animal's development and/or optimize its production, e.g. milk production, by controlling the type and amount of feed consumption.

The systems disclosed herein may be configured to carry out any of the herein disclosed methods.

BRIEF DESCRIPTION OF FIGURES

FIG. 3 illustrates examples of features established in respect of the back of an animal, here the back of a cow.

FIG. 4A illustrates the height profile along the backbone of a cow.

FIG. 4B illustrates the height profile along the backbone of another cow.

FIG. 5 illustrates a Mesa Imaging 3D reconstruction of the part of a cow with a height above 90 cm from floor level.

DETAILED DESCRIPTION OF THE INVENTION

Figure 1:
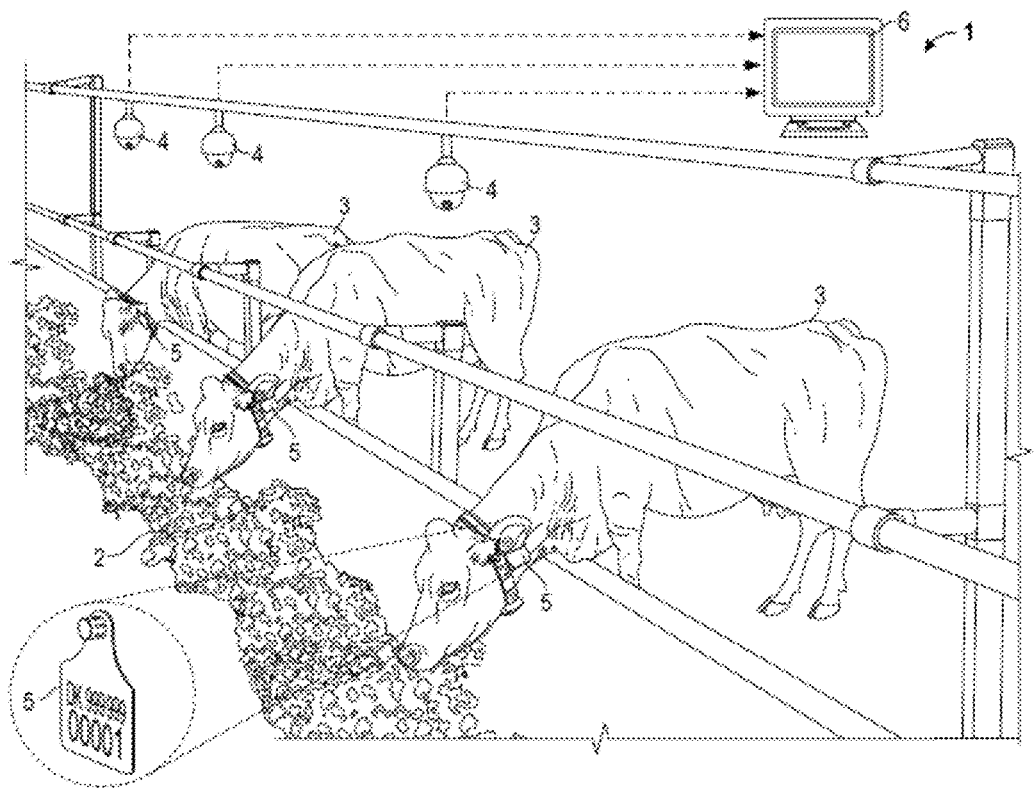
FIG. 1 illustrates eating cows in a cowshed in which a system of the present invention is installed.

An aspect of the invention relates to a method for determining the identity of an individual animal from the natural appearance and/or topology of the back of the animal as described above. When comparing data extracted from at least one image of an (un-identified) animal with reference data extracted from at least one reference image, the data to compare is obtained from corresponding features of the back of the animals. The data to compare is extracted from features of the back of animals. Such features are based on the natural appearance and/or topology of the back of the animal. Natural features may include any feature described herein as well as any marks in the skin such as scratches, scars etc. Preferably natural features do not include permanent ID-tags applied to the animal by human, such as brands or identification numbers applied by e.g. freeze branding, hot branding or tattooing.

The identity of an animal may be an identification number, a name or code used to uniquely identify the animal, e.g. in the population, in a region, country and/or globally. An 'identified animal' is therefore an animal with an identity.

An 'un-identified animal' as used herein means an animal in respect of which at a certain point of time no identity is connected to an image of the back of the animal and where the identity may be an identification number of the animal. An un-identified animal is preferably an animal belonging to a population of identified animals, e.g. each animal having an identification number, this population may be a herd of e.g. cows or cattle or other animals described elsewhere herein. When using the method and system as described herein, animals may change status between identified and un-identified animal and back again within a very short time.

The change of status of an animal may occur when an animal walks through a corral or shed and at least one new image of the back of the animal is obtained. When data extracted from this at least one image has been compared with data extracted from at least one reference image and a match is found the animal changes status from un-identified to identified. An un-identified animal may thus also be denoted as an animal to be identified.

An image of an un-identified animal is preferably obtained at a location where it is not easy or impossible to register an ID tag of the animal unambiguously simultaneously with obtaining the image. Such a location may be in a field where the distance from an electronic ID tag to an antenna capable of registering IDs is too large for registering and/or a non-electronic ID tag cannot be viewed by an imaging means due to too long distance and/or the tags position at the animal makes it impossible to view the ID tag. The location may also be where animals are too close to each other to register an individual ID which for certain can be connected to an image of the animals back taken substantially at the same time where the animal ID is registered. Such a location may also be a field or a loose-housing system, e.g. a loose-housing system for cows, such as a feeding area for cows in loose-housing systems.

The term 'the back of an animal' as used herein as 'back of an un-identified animal' or 'back of an identified animal' is a reference to the anatomical part of the animal containing the spinal column, i.e. the dorsum. Thus, the term 'the back of an animal' as used herein is not intended to refer to the hind or rear of the animal, e.g. the part of the cow comprising its hind legs, as might be viewed from one side of from behind the animal. Thus the at least one image and the at least one reference image are obtained from above the animal e.g. directly from above or from an angle above the animal. Images and reference images taken from above an animal may together with the back also include the head and neck of the animal and these parts of the animals may also be used to compare an image with at least one reference image.

Figure 7:
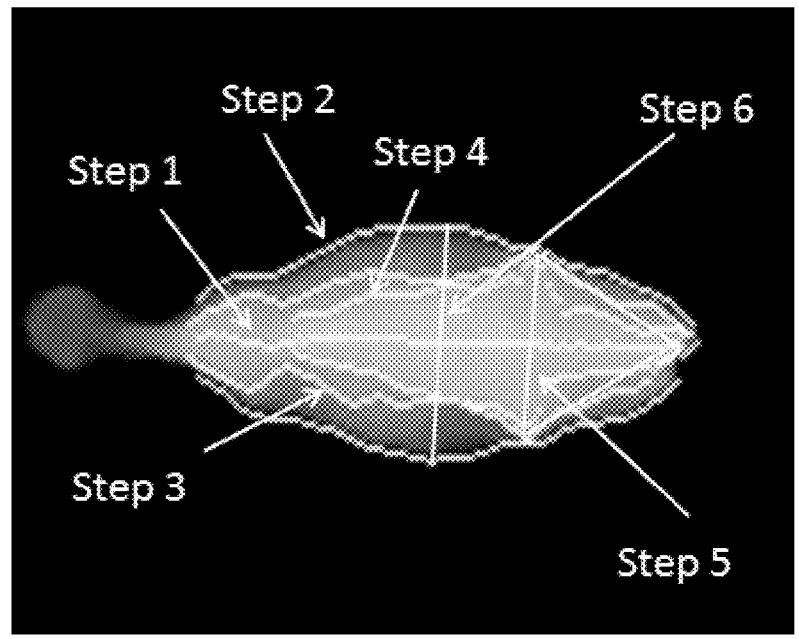
FIG. 7 illustrates the back of the cow of FIG. 6 with indications of some data/features which can be used in the analysis.

The present invention is based on the realization that the back of an animal can be used as a unique anatomical characteristic. Hence, by acquiring one or more images of at least a part of the back and extracting data relating to the anatomy and/or topology of the back, the animal can be identified by comparing to previously referenced characteristics. An image of the back an animal as used herein should therefore comprise sufficient information such that relevant characteristics of the anatomy and/or topology of the back can be extracted from the image. In one embodiment at least a part of the spinal column is therefore included in the image. In a further embodiment an image of the back of an animal includes the spinal column from the tail head along and at least to the point where the neck begins. The beginning of the neck (seen from the back towards the head of the animal) may be defined by a 'neck point' which is the location between the body of the animal and the head where the body thickness is less than a predetermined part of the widest width of the animal, for cows and cattle the 'neck point' may be where the neck is less than 38% of the widest width of the animal. The 'neck point' for cows is illustrated in FIG. 7 as the area including the left end points of the curves illustrated along the back of the cow. Preferably also the position of at least one shoulder-blade (scapula) is included when obtaining an image of the back of an animal.

An image of the back of an animal preferably also includes at least the upper 10, 15 or 20 cm of at least one side of the animal, where this distance is calculated from any highest point along the spinal column and downward, hereby the spinal column and a virtual lower line e.g. 15 cm below the spinal column would have similar contours (be parallel). For cows/cattle an image of the back should preferably include at least the spinal column from the tail head to the neck and at least 15 cm below the spinal column on at least one side of the cow/cattle.

When obtaining at least one image of the back of an animal the ideal situation is to obtain the at least one image substantially directly above the animal, where the image can include the spinal column and the area on both sides of the spinal column which is visible from above However for practical reasons it may be unfeasible to use an imaging system where each animal, e.g. in a stable, can be imaged directly from above. In practical implementation (a part of) the area on one side of the spinal column can be partly or fully blocked by the higher lying spinal column in the field of view in the image(s), for example if the imaging system is not located high enough relative to the corresponding animals.

Hence, when obtaining at least one image of the back of an animal where the image is obtained from an angle such that it does not include data from both sides of the spinal column, or if data of a part of one side of the spinal column is missing, then the missing data may be calculated such that the corresponding data from one side of the spinal column is mirrored to the other side of the spinal column to obtain an entire set of data of the back of the animal. Such an 'entire set of data' should be understood as the term 'image' as used herein i.e. an 'image' may be data obtained from an image obtained without mirroring any data or it may be data obtained from an image obtained with mirroring some data. In practice an image of an animal may be obtained including the spinal column and the area on just one side e.g. the left side of the animal, this image may be turned into an 'entire set of data' by mirroring the data from the left side to the right side of the animal before using the image (i.e. the entire set of data) to determine the identification of the animal as described herein. Mirroring data from one side of the back of an animal to the other side of the back of the animal may be performed for any images obtained, such as images obtained at an angle of less than ±90° where the starting position is the location of the longitudinal direction of the spinal column.

The step of mirroring data may be performed when the processing of data registers missing information, such that the missing information may be obtained by mirroring the corresponding data from the other side of the spinal column.

Mirroring is not necessary if enough information is contained in the image such that sufficient data relating to anatomical and/or topological characteristics of the back can be extracted from the image in order to identify the animal.

The data obtained from an image may also include data related to the neck and/or to the head. Such data may however be used for other purposes than for determining the identity of the animal, e.g. for determining the location of the nose. When determining the location of the nose this may correspond to the fact the animal is eating and from where the animal is eating, such information may be correlated to information determining the feed intake. Thus by identifying the nose of an eating animal this corresponds to identify the location of a virtual feeding trough from where the feed intake may be determined.

The term "compare images" should be understood as comparing data extracted from the images.

In a reference image of an animal the identity of the animal shown in the image is known.

One or more reference images of the back of an animal, such as an identified animal, may be obtained at least once a month, such as at least every third week, e.g. at least every second week or at least once a week. Preferable a reference image is obtained at least twice a week, such as at least three times a week e.g. at least four times a week, such as at least five times a week. Preferably at least one reference image of an animal is obtained at least every second day, more preferable at least one reference image of an animal is obtained at least once a day, such as twice a day, e.g. three times a day.

For determination of an interval between obtaining at least one reference images of the back of an animal, possible changes of the natural appearance and/or topology of the back should be considered. The interval between obtaining subsequent reference images should be short enough to register changes of the appearance and/or topology of the back for the individual animal and still be capable of identifying the animal based on images of the back. For dairy cattle the interval in time between obtaining reference images is preferably shorter than for fattening cattle. Also the purpose of identifying an un-identified animal should be considered when determining a time interval between obtaining reference images. Such purposes are described elsewhere herein and may be related to a request for information of e.g. physiological status, stature, health, fitness etc.

A reference image of an animal can be obtained at a location where it is known that the animal has to pass at least one time a day if this is the determined interval between obtaining reference images. Such a location can be at the entry or exit from the milking area if the animal is in a group of dairy cows. A location for obtaining a reference image may also be at a drinking trough, at a drive way, drink station or another place where the animal most likely will be or pass every day or frequently.

The suitable time and longest acceptable time i.e. the interval between obtaining two reference images of a single animal may also be determined due to characteristics of the animal, these characteristics may be race, breed, age, matureness, health etc. The interval may also be determined due to the purpose of controlling the animal and the purpose of identifying the animal. The purpose of controlling the animal can be for the production of milk, meat, young (e.g. piglets) or semen or it may be for other purposes such as conservation or presentation in e.g. ZOOs or use for competitions e.g. horse race and show jumping. Each purpose for keeping the animal may affect the animal shape including the back appearance or back topology differently and with different speed. An animal kept for milk production may have a negative energy balance and is usually getting thinner rather quickly during the period with milking and therefore a short interval between obtaining reference images may be recommended, whereas an animal kept for meat production although increasing its size does not change appearance or topology of the back as fast as a dairy cow and for the animal kept for meat production it may only be necessary to obtain a reference image once a month or once every second week. Other factors may also have an influence on the appearance of the appearance and/or topology of the back of the animal such as the health.

A reference image and/or reference data of an animal is an image of (the back of) and animal or data, e.g. anatomical characteristics, corresponding to the animal where the identity of the animal is known, i.e. if the image is stored in a database the identity of the animal is associated/connected with the image and data associated with the image comprises information of the identity of the animal.

In an embodiment at least one reference image of the back of an animal is obtained by
  providing the identification number of the animal, hereby the animal being an identified animal and
  acquiring at least one image of the back of the identified animal.

The identification number of the identified animal and the at least one image of the back of the identified animal can subsequently be stored together in a database, the image hereby being a reference image. Data can also be extracted from the image to provide reference data of the identified animal and reference data can be stored, e.g. in a database. Storing the reference data only instead of the actual images is more efficient in terms of storage space.

Providing the identification number of an animal and providing at least one image of the back of this animal may be done simultaneously or shortly after each other in any order. Shortly may mean within less than 60 seconds, such as less than 30 seconds, e.g. less than 15 seconds, e.g. less than 10 seconds, such as less than 5 seconds, e.g. less than 1 second, such as less than 0.5 second.

When the identification number of the animal is obtained and at least one image of the back of the same animal is obtained and these are stored together this is a reference image of an identified animal, i.e. the animal's identification and the appearance, anatomy and/or topography of its back is known or may become known when obtaining and processing data from the at least one image and these data may be stored together with the animal-ID in a database. The identification number of an animal may be obtained by any known method e.g. based on an electronic tag, such as electronic ear tag, an electronic tag in a collar or a microchip beneath the skin. Also non-electronic tags are possible.

When the identity of an animal is obtained e.g. by an identity determining device, this may trigger a system to providing at least one image of the back of this identified animal. The reference image of the back of an identified animal may also be obtained shortly after the identification number of the identified animal has been provided. A reference image and/or the ID of the animal may also be obtained manually where the ID number is entered into a system by a human and/or a human may trigger a camera to obtain at least one image of the back of an animal with the ID number that is or is to be entered into the system.

In principle any animal image, or extracted data thereof, acquired as described herein may become a reference image, because once an identification of the animal in the image is provided according to the herein disclosed method there is an association/connection between the image of the animal and the identity of the animal in the image.

When a new animal enters a population e.g. when a new cow or cattle joins a herd at least one reference image may be obtained of the back of this animal. The at least one reference image may initially be considered an image of an unknown animal and tested in the system to make sure no match is obtained between this image and the reference images in the database. If a match is found between the at least one image of the new animal and the reference images in the databases the number of features used to compare images and reference images should preferably be increased until no match is obtained based on the image of the new animal. Afterwards the at least one image of the new animal can be considered a reference image or a group of reference images. For each animal a number of reference images may be stored. When comparing at least one image of an un-identified animal with reference images, it may be decided only to compare with the reference images obtained latest for each identified animal, such reference images may be e.g. the latest 2, 3, 4, 5, 6, 7, 8, 9 or 10 reference images obtained for each animal or it may be averages of data extracted from reference images obtained the latest e.g. 2, 3, 4, 5, 6, 7, 8, 9 or 10 times the animal has been subjected to recording reference images.

In practice each one of at least one image of an un-identified animal may be compared to at least one reference image of a number of animals. An identity of an animal may be determined by comparing a number of images of the back of this animal with a number of reference images of animals e.g. in a herd and the identity may be determined to be the match with reference images obtained most times. If e.g. 10 images of an un-identified animal are compared to reference images and 8 of these images match at least one reference image of animal A and the remaining 2 images match at least one reference image of animal B the un-identified animal may be determined to be animal A.

The number of images of the back of an un-identified animal which should be compared with at least one reference image of a number of identified animals may be at least 5, such as at least 10, e.g. at least 15, such as at least 20, e.g. at least 25, such as at least 30, e.g. at least 35, such as at least 40, e.g. at least 45, such as at least 50, e.g. at least 75, such as at least 100. Preferably the number of images of the back of an un-identified animal which should be compared with at least one reference image of a number of identified animals is about 5, such as about 10, e.g. about 15, such as about 20, more preferably as about 10, e.g. about 15.

The image and the reference image may be topographic images of the back of the animals, such that both are 3D images. 3D images may be turned into layers of 3D images, hereby the image and reference image each may be multiple layers of 3D-images each including a number of pixels corresponding to the size (length and width wise) of the animal and the number of layers corresponding to the height of the animal. When determining the identity of an un-identified animal the at least one obtained image is compared with the at least one reference image by comparing data in respect of at least one feature obtained from the at least one image with a data in respect of at least one corresponding feature obtained from the at least one reference image.

The at least one feature used for comparing at least one image with at least one reference image may be values of the area of multiple layers of said 3D-image. The at least one feature may also be values selected from the group of: topographic profile of the animal, the height of the animal, the broadness of the animal, contour line or height profile along the backbone of the animal, the length of the back, contour plots for different heights of the animal, size of cavities, depth of cavities, the distance between two pre-selected points or features at the animal, angles between lines determined between pre-determined points or features of the animal, vertical height profile(s) at different pre-selected points. Examples of the use of data extracted from images are described in Example 2, one or more of these data types may be used together with any other data types mentioned herein as well as with more types of data extracted directly from the images or calculated from data extracted from the images and the type and number of data may be determined due to the number of animals and due to the animal species and/or race in a herd.

Height of the animal may be the average height of the contour line along the backbone or it may be the height at the legs e.g. the average height at the legs or it may be the height at the tail head. The length of the back may be determined as the length in a height of 90% the total height of the animal e.g. for an animal with maximum height of 165 cm the length of the back is determined at the height of 148.5 cm. A broadness of the animal may be determined as the broadness between two pre-selected points. A contour line length along the backbone may be determined as the distance from the neck to the tail head. A vertical height profile may be determined along the length of the backbone. When determining contour plots for different heights of an animal, the area of the back of the animal at certain heights is determined e.g. % of height at 166-170 cm, % of height at 161-165 cm, % of height at 156-160 cm, % of height at 151-155 cm, of height at 146-150 cm etc to obtain a group of areas for the animal. The described height may be amended due to the actual height of an animal to be identified of an identified animal. Examples of contour plots are given in Example 2.

When comparing data from images to determine the identity of an animal, this may be performed by comparing 'masks' of the back of the animal with corresponding 'masks' of animal backs in reference images. A 'mask' may include the animal's back and optionally also the neck and the head of the animal. A 'mask' of an animal's back is data describing the topology of the animal's back and may be visualized as shown in FIG. 5.

Pre-selected points can be selected from the group of right hip, left hip, right shoulder, left shoulder, tail head, neck, (1) left forerib, (2) left short rib start, (3) left hook start, (4) left hook anterior midpoint; (5) left hook, (6) left hook posterior midpoint, (7) left hook end, (8) left thurl, (9) left pin, (10) left tail head nadir, (11) left tail head junction, (12) tail, (13) right tail head junction, (14) right tail head nadir, (15) right pin, (16) right thurl, (17) right hook end, (18) right hook posterior midpoint, (19) right hook, (20) right hook anterior midpoint, (21) right hook start, (22) right short rib start, and (23) right forerib. The indicated numbers correspond to numbers in FIG. 2. The location of these points and/or their height e.g. above floor level may by itself be data for comparison of images however, more preferably these points are used for calculating distances to each other, for calculating angles between different lines between different points, for determining location of longitudinal and/or vertical height profiles etc.

The features to use when comparing at least one image with at least one reference image may be any feature which is measurable and/or detectable. Preferably the feature is a natural characteristic of the animal such as a part of the phenotype of the animal, although also wounds and/or scars may be used as a feature. The feature is preferably not a mark applied to the animal by human such as a brand e.g. an ID brand. Phenotype features include the features mentioned above and can also be skin colors, color pattern, location of cavities, depth of cavities and/or areas of cavities.

When comparing the at least one feature or data obtained from at least one image this may be performed as a sequential identification procedure sequentially comparing a single feature of an un-identified animal with a corresponding feature of identified animals.

A sequential identification procedure can be by comparing a first feature e.g. the animal height obtained from an image of an un-identified animal with a corresponding first feature of images of identified animals i.e. from reference images, hereby close in on the identified animals fulfilling the feature (=a closed in first population), and afterwards proceed to a second feature e.g. length of the back of the un-identified animal which is compared to the second feature of identified animals of the closed in population further closing in this population to a closed in second population. This procedure is continued with other features until a match of the un-identified animal with a single identified animal is obtained. The final match of the un-identified animal with a single identified animal indicates that the un-identified animal corresponds to the identified animal and hereby the un-identified animal is identified.

Comparing of the image with the reference image may also be performed by comparing feature vectors obtained from the at least one image with corresponding feature vectors obtained from the at least one reference image. A feature vector may be based on at least two of the features described herein.

When comparing the at least one feature or data obtained from at least one image this may also be performed by calculation of a value for each picture where this value is determined from a number of data. The value may be a dot product between vectors e.g. as described in Example 2.

The at least one image and the reference image of the back of animals may be obtained within an angle of between 0 and 50 degree above the animal, where 0 is in a direction straight above the central part of the back of the animal such as straight above the backbone of the animal. Preferably the angle is between 0 and 40°, more preferably between 0 and 30°.

When obtaining at least one image and/or at least one reference image within an angle different from 0, the system may automatically correlate for the deformation within the images and/or the comparing of at least one image may be performed with at least one reference image obtained from substantially same angle measured according to any line drawn through the animal. Substantially same angle may be a deviation of ±5°, such as ±4° e.g. ±3°. Preferred is ±2° most preferred is a deviation of ±1°.

The at least one reference image of the back of an un-identified animal is preferably obtained with only one animal present in an area covered by a reference imaging unit providing at least one reference image of the back of the animal.

A triggering mechanism can be located close to the reference imaging unit. The triggering mechanism may be located such that when an animal is activating the triggering mechanism the mechanism is actuated and sends a signal to the reference imaging unit to collect at least one image of the back of the animal. For example, a detector could be mounted on a gate which is triggered when the cow contacts the gate.

The at least one image of the back of an un-identified animal may be obtained with one or more animals present in an area covered by an imaging unit for obtaining images of the back of at least one un-identified animal. The system is preferably capable of distinguishing different animals from each other in one image i.e. when an image covers more than one animal each of these animals can preferably be identified.

The method as described herein may be used for identifying any kind of animal. Preferable the animal is selected from the group of cattle, cows, dairy cows, bulls, calves, pigs, sows, boars, castrated male pigs, piglets, horses, sheep, goats, deer. The animal may also be one or more animals living in a ZOO, a park or in the nature. Such animals may be elephants, monkeys, giraffes, hippopotamus, rhinoceros, wolfs, foxes, bears, tigers, lions, cheetahs, pandas, leopards, tapirs, llamas, camels, reindeers, okapis, antelopes, gnus.

The method of identifying an animal can be used to check whether the identified animal is still among the population or it may be dead. The method can also be used to further analysis as described herein such as to estimate the health or wellness of the animal or be combined with other methods to estimate the feed intake of the animal, such as a system for determining feed consumption of at least one animal as described in WO 2014/166498.

Registered health conditions may be used to evaluate different conditions such as:
  the physiological status of the animal, including body scoring elements detectable in the images obtained from above the animal i.e. from the back of the animal, the neck and the head,
  the overall health status of the animal,
  state of reproduction i.e. whether the animal such as a cow is ready to be inseminated/fertilized; this may be predicted from the eating behavior such as reduced feed consumption (combined with a good health status to be sure the animal is not ill),
  behavior such as eating behavior, e.g. how long time the animal is at a feeding trough (in loose-housing systems the feeding trough may be a virtual feeding trough as the animal can select different places for eating), how long time the animal is actually eating, how often the animal is eating, how much the animal eats when eating and how much the animal eats per day,
  indications of illness, such as reductions and/or changes in the feed consumption and/or eating behavior.

Another aspect of the invention relates to a system for determining the identity of an individual animal from the appearance and/or topology of the back of the animal, the system comprises
  An reference imaging unit for providing reference images of at least one identified animal, where the reference imaging unit comprises
    at least one identity determining device for determining the identity of the identified animal,
    at least one camera for obtaining at least one image of the back of the identified animal,
    at least one database for storing at least information of identity of at least one identified animal and at least one image of the back of the identified animal, and
    data transmission means for transmitting data from the identity determining device and the camera to the database,
  An imaging unit for obtaining at least one image of the back of at least one un-identified animal, where the imaging unit is connected to the database for transmission of data from the imaging unit to the database, and
  At least one processing means connected to the database for comparing the at least one image from an un-identified animal with at least one reference image and based on this comparing determine whether the un-identified animal corresponds to the identified animal.

The image obtained by the system may be a 3D image and also the reference image may be a 3D image and thus a reference 3D image.

The imaging unit of the system may comprise at least two cameras. These two cameras may be located at any distances from each other making it possible to cover areas of interest. Preferably the at least two cameras are located at mutual distances of within 15 M, such as within 10 M, e.g. within 5 M from each other for simultaneously obtaining at least one image by each camera of the back of at least one un-identified animal, where the at least two cameras are connection to the database for transmission of data from the cameras to the database and where the database constructs at least one 3D image of the animal based on the images from the at least two cameras.

The at least one camera of the reference imaging unit and of the imaging unit may each be one or more cameras selected from the group of range cameras, stereo cameras, time-of-flight cameras. Preferably the reference imaging unit and the imaging unit comprises cameras of equal type.

The reference imaging unit and/or the imaging unit may comprise at least one range camera with a depth sensor and a 2D camera, such as a RGB camera. The reference imaging unit and/or the imaging unit may also comprise at least a time-of-flight camera.

Preferably the reference imaging unit and the imaging unit of the system are configured for acquiring topographic images.

The system may be set up such that the camera of the reference imaging unit is activated to obtain an image of the animals back when an animal is close to the identity determining device and the identity of the animal has been registered. A triggering mechanism as described elsewhere may be a part of the system.

The system may also comprise ID tags. Such ID tags may be connected to animals to be identified. ID tags may be visual and/or electronic ID tags. Electronic ID tags may be electronic ear tags and/or electronic ID tags attached to an animal such as in a collar. A single animal may be marked with one or more ID tags such as at least one visual ID tag and/or at least one electronic ID tag. An example is at least one visual ear ID tag combined with at least one electronic ID tag in a collar. Another example is at least one visual ear ID tag combined with at least one electronic ear ID.

The system may also comprise identity determining device such as a camera suitable to obtain images of visual ID tags. The identity determining device may also comprise an ID reader capable of registering an animal identity based on electronic identity markers located in or at an animal.

The system comprises a database which may store multiple reference images of a single animal. The database may store multiple reference images of a single animal from each day. Such reference images may be obtained with different time interval during a period of a day, two days, three days, four days, five days, six days, a week or at longer intervals. The time between obtaining reference images of an animal may be determined such that each time the animal is in an area of an identity determining device the system determines the identity of the animal and obtain at least one reference image of the back of the animal. The system may store reference images and/or other images of an animal e.g. for the animal's entire lifetime or for the time the animal is kept at the location, e.g. at the farm where the images are obtained. Images may also be stored for much longer time and may be used as statistical data for different purposes, such as evaluation of feed types, feeding methods and breeding, e.g. value of specific crossings or values of specific male animals.

The system as described herein may also be used for monitoring individual animals, such as in relation to health status and risk of illness. Such monitoring may be based on any changes of the body observed, e.g. from day to day or by comparing data obtained from a number of days, such as two days, three days or more. The system may automatically monitor each animal in a population and certain threshold values based on changes in the registered information may be included in the system, such that an alarm or information note is created by the system when an animal's body change too much within a specified time period.

Preferably the database stores at least reference images of a single animal for at least one month, such as at least two months, such as at least half a year, e.g. at least one year. Preferably the database stores at least reference images of a single animal until this animal is no longer within the animal population or no longer present e.g. due to being sold or dead.

The system comprises processing means which may select features from the at least one image and the at least one reference images before comparing these features. Examples of types of features are described elsewhere herein. The processing means of the system may compare features from at least one image with features from at least one reference image by any known comparing method.

For comparing features the processing means may use a method where predefined feature vectors of an animal for preselected distances calculated from the ground or floor are compared. When comparing at least one feature from at least one image with at least one corresponding feature from at least one reference image the processing means may determine and compare areas of layers of 3D-images. Such areas may be part of feature vectors or may constitute features for e.g. sequential comparing at least one image with at least one reference image.

When establishing features from images i.e. from at least one image of an un-identified animal, and these at least one image in fact are two or more images, these images may be obtained within a short period of time such as within less than 20 seconds, e.g. within less than 10 seconds, such as within less than 5 seconds, e.g. within less than 3 seconds, such as within less than 2 seconds. For such series of images a feature may be established based on a single image or may be an average based on two or more images of the series.

When establishing features from reference images i.e. from at least one reference image of an identified animal, these features may be established from one or more images from series of an identified animal and in a manner as described for images of un-identified animals.

Areas of layers of an animal may be determined for layers with a pre-selected plane distance. Such a pre-selected plane distance may be about 8 cm, such as about 7 cm, e.g. about 5 cm, such as about 4 cm, e.g. about 3 cm relative to a predefined fix point. Preferably a pre-selected plane distance is about 5 cm. Hereby the processing means can make a calculation of the area of an animal such as the area of the back at horizontal planes with mutual distances of the pre-selected plane distance e.g. 5 cm. Such areas of layers may constitute features for comparing at least one image with at least one reference image.

Areas of layers may also be used to determine percentage of an animal above a preselected level. Different areas of the animal back determined at pre-selected plane distances and calculated as percentages relative to a preselected level may constitute features for comparing at least one image with at least one reference image. An example: A pre-selected level may be 135 cm above ground level and at this level the area of a horizontal plane of the animal back is calculated. A pre-selected plane distance may be 5 cm and the area at these levels i.e. at 140 cm, 145 cm, 150 cm, 155 cm etc above ground level can be determined. The areas can be converted into percentages in respect of the area at the pre-selected level i.e. in this example at 135 cm, and these percentages may constitute features for comparing at least one image with at least one reference image.

Determining features to be used when comparing at least one image with at least one reference image may be based on plane areas as described above and may be performed for pre-selected distances calculated from the ground or floor. Such pre-selected distances can be selected due to the height of the animal species, animal race and/or animal type which should be identified. A pre-selected distance for animals with at maximum height of e.g. 180 cm may be 140 to 180 cm and can be combined with a pre-selected plane distance of e.g. 5 cm such that areas of animals or the back of animals are determined for distances of 140 cm, 145 cm, 150 cm, 155 cm, 160 cm, 165 cm, 170 cm, 175 cm and 180 cm above ground level. Such areas may be used as exact numbers and/or as percentage of the area at a pre-selected level e.g. 140 cm above ground level and may hereby be used as features for comparing at least one image with at least one reference image.

Instead of determining the areas at different planes the planes can be assumed to be a ground level for determining the volume of the animal back above this ground level i.e. volume of the animal above different heights of the animal. Each plane e.g. 120 cm, 125 cm, 130 cm etc. above ground level may thus have its own ground level and for each of these ground levels the volume above this ground level can be determined. One or more of these volumes can be used as a feature for comparing at least one image with at least one reference image. The planes for determining volumes of animal backs above the planes may be selected due to the maximum or average height and/or size of the animal species, race, type etc. to be identified.

Reference images may be acquired at a location where the cows are well positioned relative to a 3D camera under which each cow in the flock passes one or more times per day. At this location each cow's RFID tag is read such that cow ID and 3D images can be paired. Over time a large library with images of all cows is built up. This library of images can be used for identifying cows from images of the cows' back acquired at other locations at the farm. The library can also be used to follow the health status of each cow over time.

When determining the identity of an animal by comparing at least one feature from at least one image with at least one corresponding feature from at least one reference image the process of determining the identity of an animal may be performed sequential e.g. by first comparing coarse or overall features obtained from the image and reference images and hereby sorting out the reference images which do not meet the overall features. Second comparison may be performed based other less overall and/or more specific features obtained from the image and reference images. A third, fourth etc comparison of at least one feature obtained from at least one image may be compared with at least one corresponding feature obtained from at least one reference image until a match is obtained between the at least one image and the at least one reference image where the at least one reference image are images of a single animal.

An example of performing a sequential determination of an animal based on the invention as described herein may comprise comparing features determined in at least one image with the corresponding features determined in at least one reference image:

1$^{st}$ comparing: Height of the animal (Q),
2$^{nd}$ comparing: Color pattern of the skin (U),
3$^{rd}$ comparing: Length of the back (V),
4$^{th}$ comparing: Contour line along the backbone (W),
5$^{th}$ comparing: distance between two pre-selected points e.g. distance between the back hips (X),
6$^{th}$ comparing: location and/or sizes and/or depth of cavities (Y),
7$^{th}$ comparing: contour plots or plane areas for different planes of the animal (Z),
8$^{th}$ comparing volumes above selected planes of the animal.

The example described with sequential determination of the identity of an animal may include any suitable feature and be performed in any suitable order until all tested features obtained from at least one image of an un-identified animal corresponds to all the corresponding features obtained from at least one reference image of an identified animal, and where the at least one reference image of an identified animal if being more than one reference image all reference images are from the same individual. Determining the identity of an animal may also be performed by comparing feature vectors. In the example above indicating 7 comparisons in a sequential determination, the features are indicated by a letter, each of these letters may correspond to a feature group each comprising different possibilities e.g. for height of animal $Q_1$ is different from $Q_2$. A feature vector may thus comprise at least one feature from each feature group and such feature vectors may be compared to determine the identity of an animal.

As an example of comparing feature vectors and un-identified animal may have a feature vector of [Q, U, V, W, X, Y, Z] and assuming that only two possibilities exist within each feature group a comparison of feature vectors may be performed as indicated below, where only a limited number of the possible feature combinations are shown in feature vectors:

Feature vector obtained for un-identified animal: [$Q_1$, $U_2$, $V_1$, $W_2$, $X_1$, $Y_2$, $Z_1$]
Feature vector obtained for identified animal No. 1: [$Q_1$, $U_1$, $V_1$, $W_2$, $X_1$, $Y_2$, $Z_1$]
Feature vector obtained for identified animal No. 2: [$Q_1$, $U_1$, $V_2$, $W_1$, $X_2$, $Y_1$, $Z_2$]
Feature vector obtained for identified animal No. 3: [$Q_1$, $U_1$, $V_1$, $W_2$, $X_1$, $Y_2$, $Z_2$]
Feature vector obtained for identified animal No. 4: [$Q_1$, $U_2$, $V_2$, $W_1$, $X_2$, $Y_1$, $Z_2$]
Feature vector obtained for identified animal No. 5: [$Q_1$, $U_2$, $V_1$, $W_2$, $X_1$, $Y_2$, $Z_1$]
Feature vector obtained for identified animal No. 6: [$Q_2$, $U_1$, $V_2$, $W_1$, $X_2$, $Y_1$, $Z_1$]
Feature vector obtained for identified animal No. 7: [$Q_2$, $U_1$, $V_1$, $W_2$, $X_1$, $Y_2$, $Z_1$]
Feature vector obtained for identified animal No. 8: [$Q_2$, $U_1$, $V_2$, $W_1$, $X_2$, $Y_1$, $Z_2$]
Feature vector obtained for identified animal No. 9: [$Q_2$, $U_2$, $V_1$, $W_2$, $X_1$, $Y_2$, $Z_1$]
Feature vector obtained for identified animal No. 10: [$Q_2$, $U_2$, $V_2$, $W_1$, $X_2$, $Y_1$, $Z_2$]

By comparing the feature vectors the only match between the feature vector for the un-identified animal corresponds to the feature vector for animal No. 5, it can then be concluded that the un-identified animal is animal No. 5. Performing a sequential comparison with the features mentioned in the feature vectors, the 1$^{st}$ comparison based on feature Q will match to animal No. 1, 2, 3, 4 and 5, which are used for the next comparison. 2$^{nd}$ comparison based on feature U will match to animal No. 4 and 5, and of these the 3$^{rd}$ comparison based on feature V will match with only animal No. 5. When an un-identified animal is identified as described herein, the system of the invention may by itself be used for obtaining different kind of information for identified animals, the system may also be extended to provide further information which can be stored together with the identity of an identified animal identified according to the method as described herein.

The comparison may also be performed by using a neural network implemented as a deep learning system. Both Neural Networks and deep learning processes are known by experts in the art of image processing. For example: A cow and its orientation in the image can be found using template matching techniques, which are also known in the art. Once an unknown cow appears in the image, features such as height, color patterns, length of back, height contour of back bone, distances between preselected points, cavities, areas at various heights and volumes above these areas may be calculated. A supervised or unsupervised neural network that has been trained on a large number of reference images from each cow in the flock can then be applied. The trained neural network can then identify the unknown cow by comparing the unknown cow with the library images of all cows.

The system may comprise means for determining feed consumption of at least one of said animal. Such means may comprise
 a feeding area imaging unit for providing images of a feeding area, and
 processing means configured for assessing the amount of feed consumed by each identified animal by determining the reduction of feed in subsequent images of the feeding area in front of each identified animal.

Processes of determining feed intake or reduction of feed in a feeding area based on comparing the amount of feed in subsequent images of the feeding area are described in WO2014/166498 ('System for determining feed consumption of at least one animal', Viking Genetics FMBA).

The feeding area imaging unit may be the imaging unit for obtaining at least one image of the back of at least one un-identified animal such that the imaging unit obtains images of the back of at least one un-identified animal as well as of a feeding area and where at least one un-identified animal is capable of eating feed from the feeding area. Preferable the at least one image covers the back of at least one un-identified animal together with a feeding area in front of this un-identified animal.

The system may determine feed consumption from at least two images of the same feeding area and where the feed reduction is calculated as the difference of feed volume within a feeding area established from the at least two images.

The imaging unit of the system may be configured for continuously imaging at least a part of a feeding area. It is also possible to have an imaging unit which is configured for imaging an area including a feeding area at predefined and/or selected time points.

The at least one camera of the system may be pivotable around at least one axis making it possible to adjust the at least one camera in different directions to obtain at least one image of at least one animal or of at least one animal and the feeding area in front of the at least one animal.

The system may also comprise at least one camera rail and/or camera wire for positioning the at least one camera relative to at least one animal and/or a feeding area in front of the at least one animal. Rails and/or wires may be suspended or stretched above an area where the animals to be identified stay and this may be an indoor area and/or an outdoor area.

The system may also comprise at least one drone, the drone being connected to at least one camera and said drone being capable of flying above at least one animal to let the at least one camera obtain at least one picture of the at least one animal. The at least one camera on the drone may be fixed or pivotable. A pivotable camera may be turned due to input from camera position means obtaining information regarding location of animals. Information of location of animals may be based on signals from at least one electronic ID tag at an animal and/or may be based on signals obtained from an infrared camera capable of detecting live animals.

A drone may be used inside a shed or stable shielding animals and/or may be used outside at areas where animals to be identified can be located such as in the field and/or in an enclosure. A drone may be used for obtaining images of un-identified animals and at other times it may be used for obtaining reference images of animals by also obtaining information from the animal from at least one electronic ID tag.

A drone when used outside together with the invention described herein may be used for different purposes such as identification of e.g. dairy cows in grassing systems, for determining the health status of an animal, etc.

DETAILED DESCRIPTION OF THE FIGURES

FIG. 1 illustrates eating cows in a cowshed (1) in which a system of the present invention is installed. Cameras (4) mounted above the cows (3) obtain images of the back of the cows and forward these images to a database and processing unit (6). The cows are marked by ID-tags such as ear-tags (5), however, if the cows are walking freely in the stable it may not be possible to identify the cows from the ID-tags. The system may be configured to obtain images of the back of the cows as well as the feed (2) in front of the cows. From the obtained images it is possible to identify each cow and estimate the amount of feed intake for each of these cows.

Figure 2:
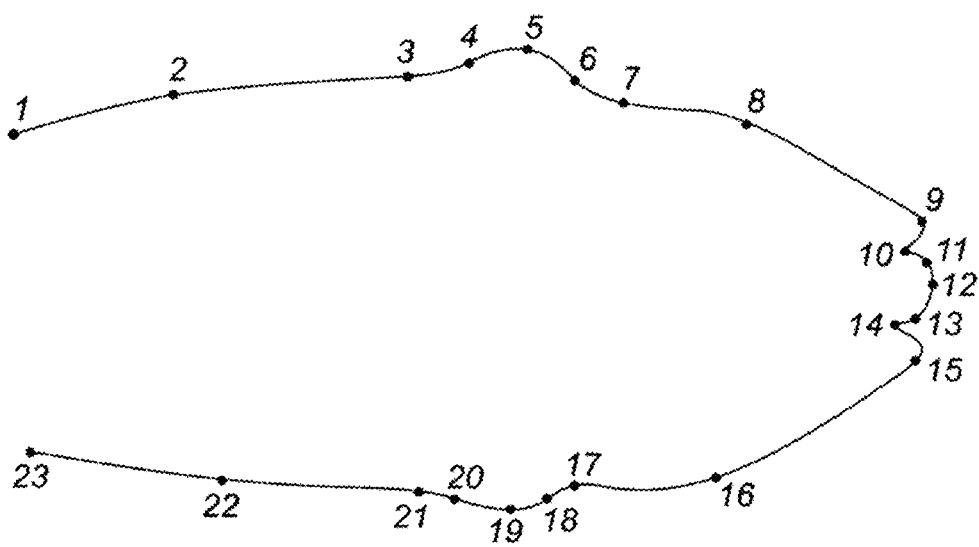
FIG. 2 illustrates examples of different pre-selected points at the back of a cow.

FIG. 2 illustrates examples of different pre-selected points at the back of a cow. Such preselected points can be used to extract further information from the images, such as lengths between different points, angles of lines between different points etc.

FIG. 3 illustrates examples of data or features established in respect of the back of an animal, here the back of a cow. The data or features indicated are:
 total area of the cow's back which is located higher than 70% of the cow's maximum height (large ellipse indicated by a stippled line),
 total area of the cow's back which is located higher than 90% of the cow's maximum height (two small ellipses within the large ellipse),
 length of a profile along the spine at a height higher than 70% of the cow's maximum height (illustrated by a dotted line in the longitudinal direction of the cow from the neck to the tail head),
 distance between hip bones at their maximum height (illustrated by a thick vertical line crossing through the small ellipse at the rear of the cow's back),
 width of the body that is higher than 70% of the cow's maximum height at e.g. 7 locations along the length of the cows body (illustrated by thin vertical lines within the large ellipse),
 colour pattern, if any (not illustrated).

FIGS. 4A-B illustrate the height profile along the backbone of two cows from the tail head (left part of graph) to the neck (right part of the graph) of a cow which is slightly higher than 1.6 M (FIG. 4A) and a cow which is about 1.7 M (FIG. 4B).

FIG. 5 illustrates a Mesa Imaging 3D reconstruction of the part of a cow with a height above 90 cM from floor level.

Figure 6:
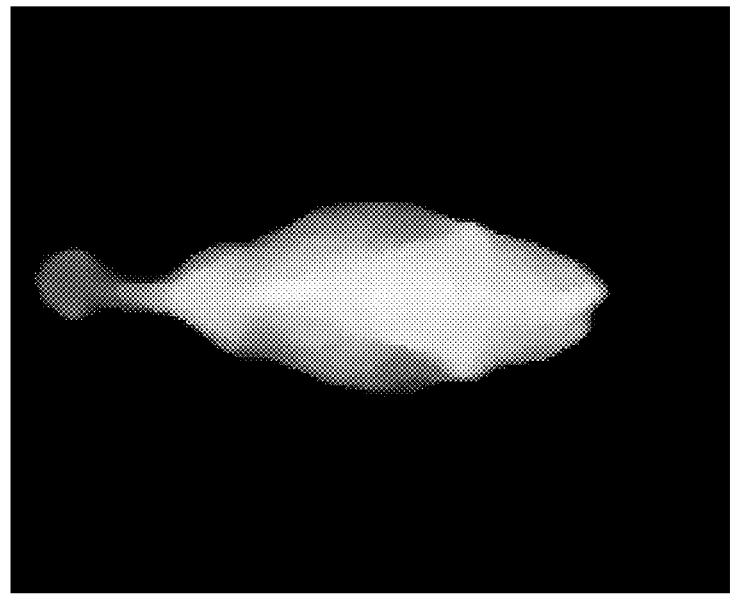
FIG. 6 illustrates the back of a cow.

FIG. 6 illustrates the back of a cow.

Figure 8:
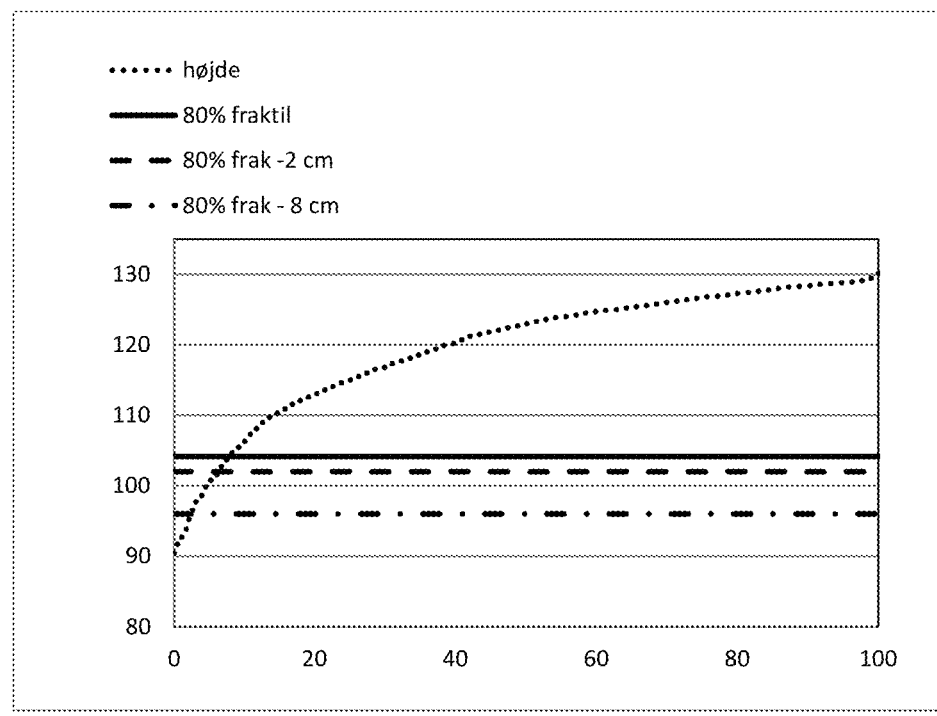
FIG. 8 illustrates area determination based on rescaled data obtained from the part of a cow with a height above 90 cm from the floor.

FIG. 7 illustrates the back of the cow of FIG. 6 with indications of some data/features which can be used in the analysis. The steps 1-6 are further explained in Example 2 and represent:

1: Length of backbone and a height profile along the backbone of the cow i.e. a longitudinal height profile.
2: Contour line of the cow at a predetermined height of 90 cm from the floor.
3: Contour plane for the pixels located higher than a cow height corresponding to the 80% quantile height subtracted 8 cM.
4: Contour plane for the pixels located higher than a cow height corresponding to the 80% quantile height subtracted 2 cM.
5: An arbitrary triangle made based on the location of the left and right hip bones and the tail head, where e.g. the angle at the tail head can be determined.
6: The maximum width in the transversal direction of the cow at the location where the cow is widest and along this line a height profile can be determined i.e. a transversal height profile FIG. 8 illustrates area determination based on rescaled data obtained from the part of a cow with a height above 90 cM from the floor. The areas beneath the graphs (and e.g. above 90 cM-line) can be determined.

FIGS. 9A-D and 10A-D illustrate different thickness profiles and height profiles at predetermined heights of two cows. In each figure the data is rescaled to 100 pixels (=X-axis) and thickness measured in pixels (=Y-axis) or height above floor measured in cM (=Y-axis). The left end of the graph corresponds to the neck region and the right end of the graph corresponds to the tail region.

Figure 9A:
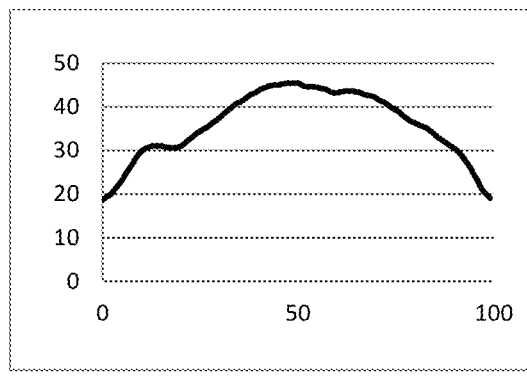
FIG. 9A illustrates a thickness profile for a first cow measured 90 cM above floor level.
Figure 9B:
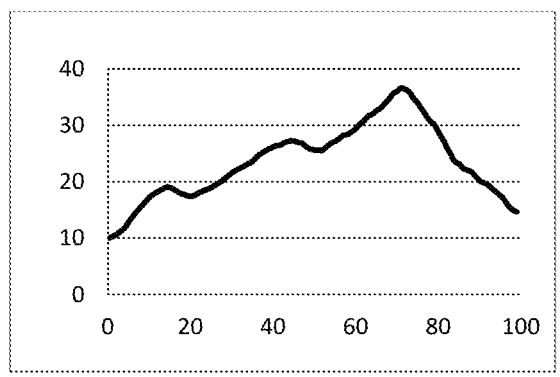
FIG. 9B illustrates a thickness profile for the first cow measured along the line indicated by step 3 in FIG. 7.
Figure 9C:
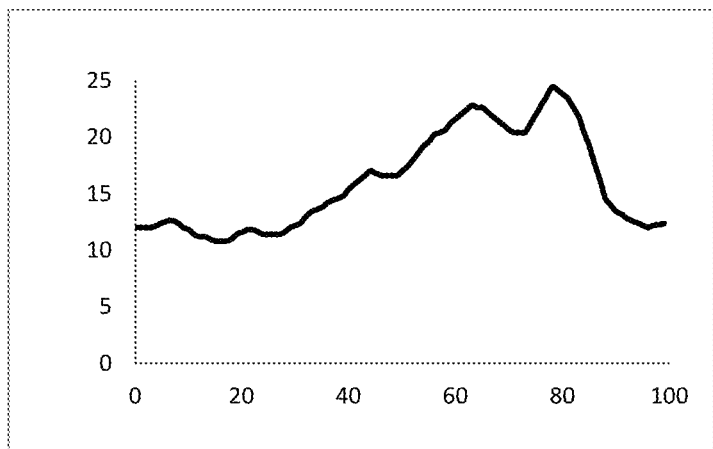
FIG. 9C illustrates a thickness profile for the first cow measured along the line indicated by step 4 in FIG. 7.
Figure 9D:
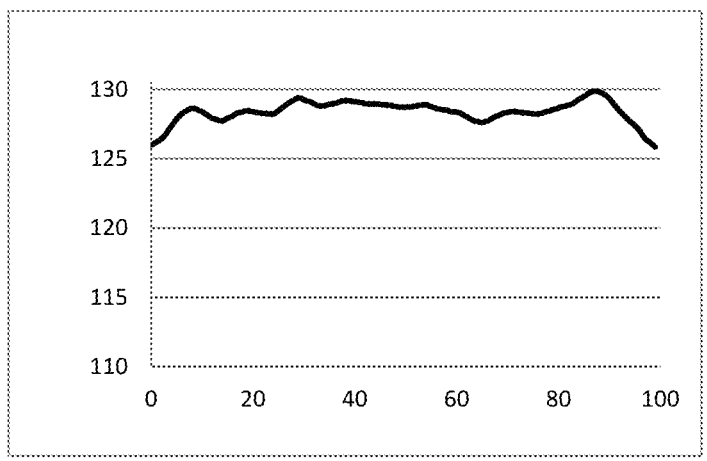
FIG. 9D illustrates a longitudinal height profile along the backbone of the first cow.
Figure 10A:
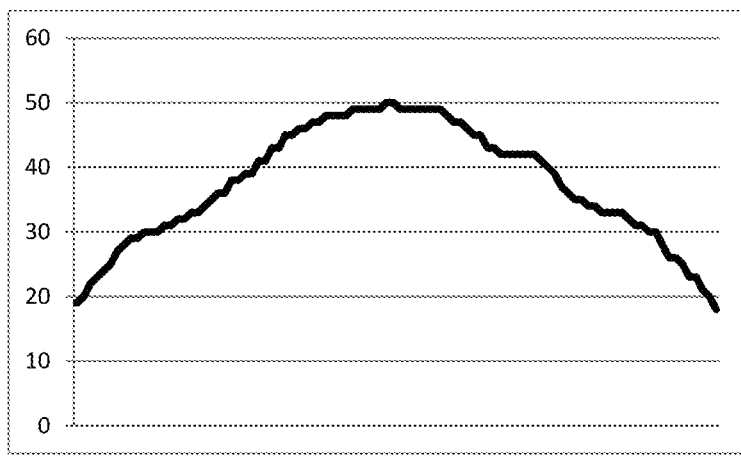
FIG. 10A illustrates a thickness profile for a second cow measured 90 cM above floor level.
Figure 10B:
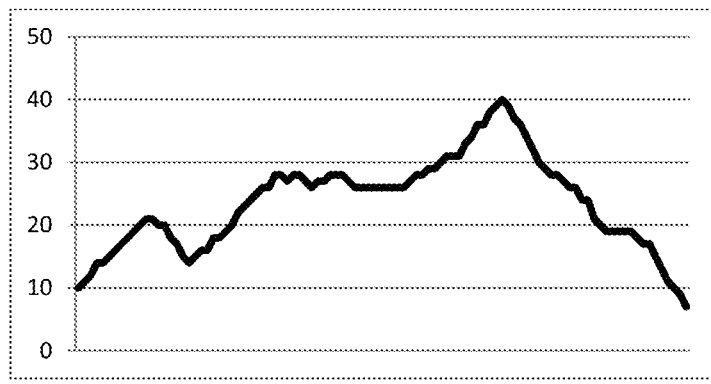
FIG. 10B illustrates a thickness profile for the second cow measured along the line indicated by step 3 in FIG. 7.
Figure 10C:
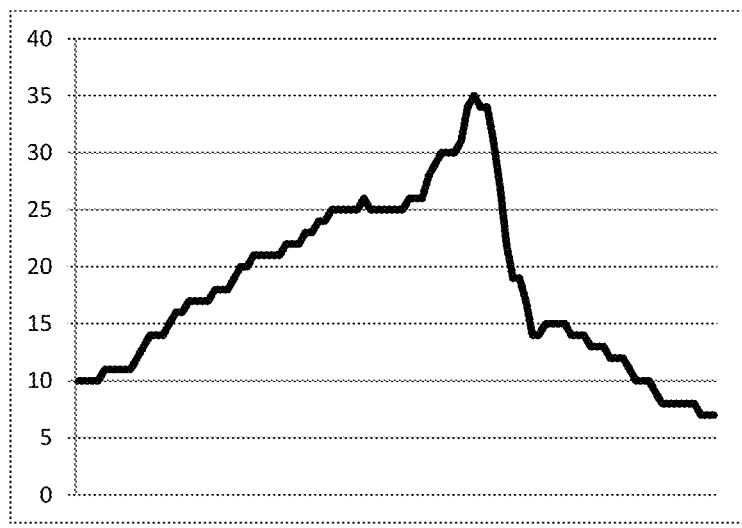
FIG. 10C illustrates a thickness profile for the second cow measured along the line indicated by step 4 in FIG. 7.
Figure 10D:
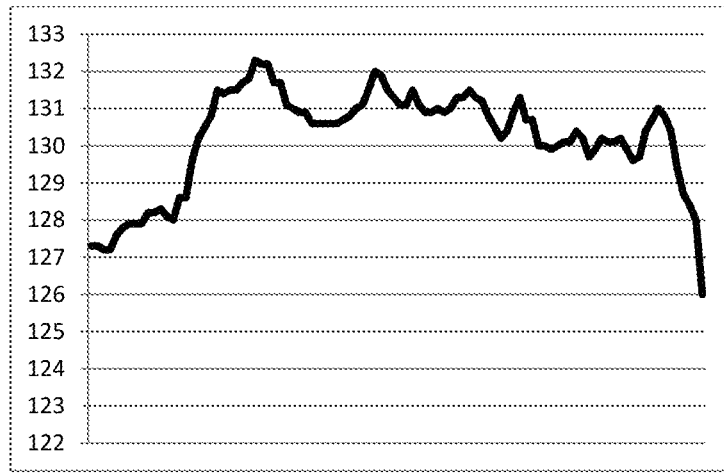
FIG. 10D illustrates a longitudinal height profile along the backbone of the second cow.

FIGS. 9A and 10A: Thickness profile for a cow measured 90 cM above floor level. Each axis indicates pixels.
FIGS. 9B and 10B: Thickness profile for a cow measured along the line indicated by step 3 in FIG. 7 i.e. at a cow height corresponding to the 80% quantile height subtracted 8 cM.
FIGS. 9C and 10C: Thickness profile for a cow measured along the line indicated by step 4 in FIG. 7 i.e. at a cow height corresponding to the 80% quantile height subtracted 2 cM.
FIGS. 9D and 10D: Longitudinal height profile along the backbone of a cow. X-axis indicates pixels, Y-axis indicates cM from the floor.

Figure 11:
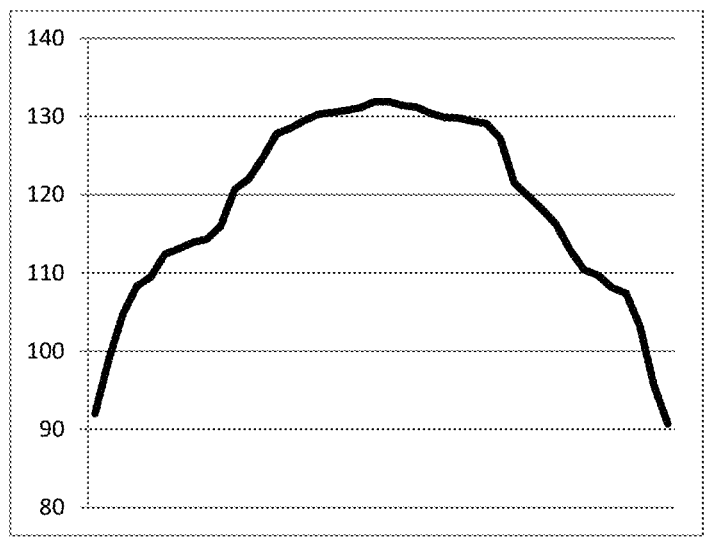
FIG. 11 illustrates a vertical height profile of a cow.

FIG. 11 illustrates a transversal height profile of a cow at the position where the cow was thickest (measured above 90 cm from the floor). The data is rescaled to 40 pixels. X-axis indicates pixels, Y-axis indicates cm from the floor.

Figure 12:
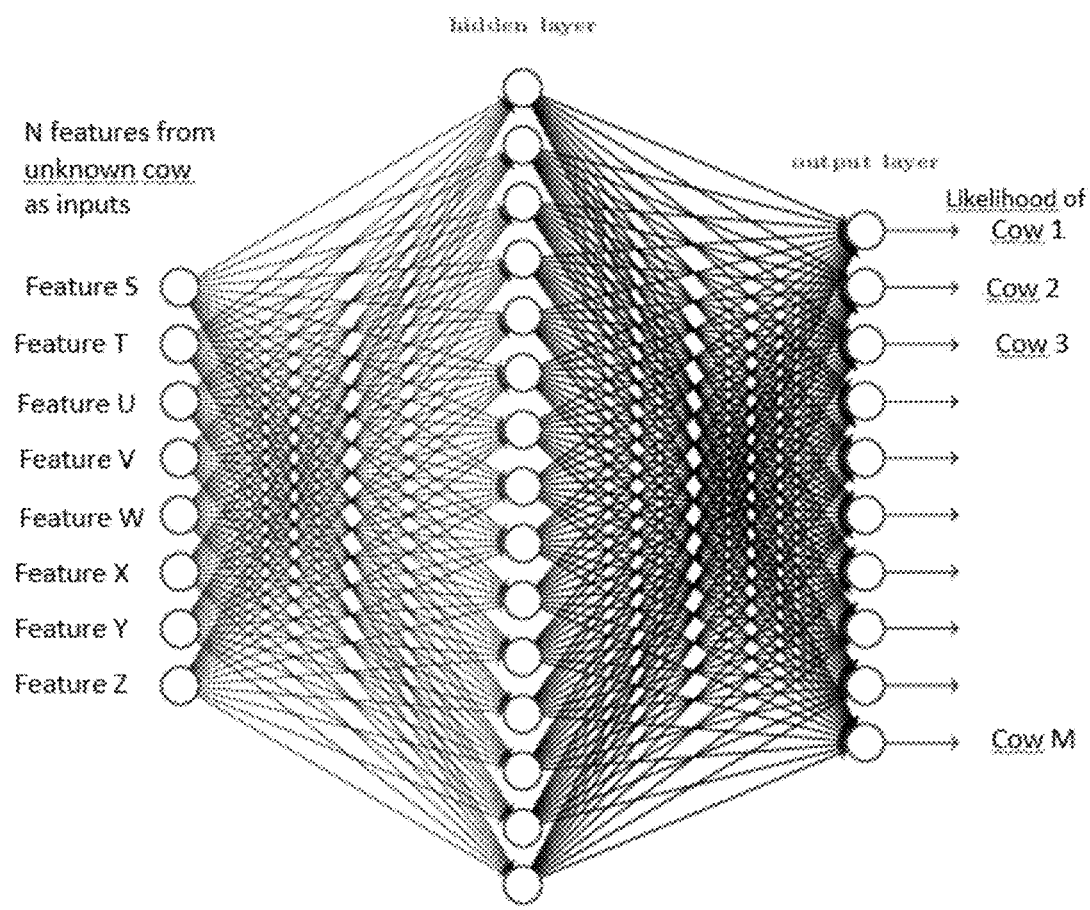
FIG. 12 illustrates determination of a cow based on neural network such as a deep learning system.

FIG. 12 illustrates determination of a cow based on neural network, such as a deep learning system. A number of features from a cow to be identified are entered into the system and an output is obtained with estimated and ranked likelihood of different matches.

Example 1

The method was developed by testing whether a number of Jersey and Holstein cows could be determined/identified from each other based on images of their backs. At a Danish farm with dairy cows 3-D images of cow's backs were provided. The system for obtaining images included a 3D camera (Swiss Ranger 4500 from Mesa Imaging, Switzerland, which is an IP 67 camera suitable for rooms with dust and moisture). In parallel with the 3D camera, two Basler black-and-white industrial cameras were mounted. The cameras were mounted 4.5 meter above the floor level. The distance from the camera to the upper part of the back of the cows was about 2.7-3 meter depending on the height of the cows. Images of the back of the cows were obtained when the cows were on their way to the milking station and at a position where the cows walked one after another. Hereby images were obtained with only one cow at each image. From the obtained 3D-images contour plots were performed as further described in Example 2 although at 148 cM, 153 cM, 158 cM, 165 cM and 172 cM above the floor level. The area of the cow's back within each of the contour plots at the indicated heights were determined. Based on the area within the mentioned contour plots the 16 cows were easily identified without mixing-up the identities. In this experiment to test whether the cows actually could be identified from the images, the cows were also identified by different visible marks painted on the back of each cow. These marks were only used to verify that the identification based on the other features was correct.

FIGS. 4A-B illustrate further features which can be used when identifying animals. The figure illustrates a contour line along the backbone. The position of the backbone is illustrated in FIG. 7.

FIG. 4A: Height profile in the longitudinal direction of the cow along the backbone of a low cow.
FIG. 4B: Height profile in the longitudinal direction of the cow along the backbone of a higher.

Both the length of the backbone as well as the height profile along the backbones can be used as features when identifying animals such as cows as explained in Example 2.

In the experiment about 6 images of each cow were obtained with about 1 second between each exposure. Analysis of each image as outlined above and comparison of data obtained from the images for each cow and between cows clearly showed much less variation for the images of one cow than between different cows.

Example 2

The identification method was further tested in another experiment with dairy cows of the Jersey race. 3-D images of cow's backs were provided with a system included a 3D TOF (time-of-flight) camera (Swiss Ranger 4500 from Mesa Imaging, Switzerland).

Also two Basler black-and-white industrial cameras were used. The three cameras were connected to a computer making it possible to store and analyze images. The 3D camera was located 3.2 M above the floor at the entrance to the milking station and where the corridor has a width of about 1 M. In a wall along the corridor an ID-reader was located to obtain a signal from the ear tag each time a cow passed the ID-reader. A trigger signal was sent to the computer each time a cow passed the ID-reader. The trigger signal prompted the computer to store one image from each of the three cameras with 0.5 sec between the exposures. The ID-reader also stored the ID of the cow obtained from the ear tag, and these ID's were only used to verify the developed identification method based solely on the images of the cow's back. The two black-and-white cameras were only used to obtain images to see the cows and the environment to check if something seemed to be strange. The images from the black- and white cameras were not used for the identification process.

FIG. 5 is a Mesa Imaging 3D reconstruction of the part of a cow with a height above 90 cM from floor level. The same data of the cow is shown in a 3D contour plot of height in FIG. 6. For each 3D image obtained the images were analyzed in different steps to obtain data and PCA-scores to calculate a vector for each cow. FIG. 7 indicates from where at the cow's back the data was obtained. The steps in the analysis are described below and indicated in FIG. 7:

a) Step 1: Calculating a height profile in the longitudinal direction of the cow along the backbone. A curve was calculated to describe the height profile along the backbone from the 'tail head' to the 'neck point' where these end positions in this measurement were determined by the point where the body thickness was less than 38% of the widest width of the cow.

b) Step 2a (Indicated as Step 2 in FIG. 7): Determining a contour line of the cow at a predetermined height of 90 cm from the floor. The contour line of the cow was determined for the same length as for the height profile in step 1 i.e. from the 'neck point' to the 'tail head'. The area within this contour line was determined as the area beneath the graph 'height' and above 90 cM in FIG. 8 as described further in Step 2b.

c) Step 2b—Further analysis of data from Step 2a: Distribution of heights in the image pixels located within the 90 cm contour line. Different distributions are illustrated as graphs in FIG. 8 where all of the pixels within the 90 cm contour line are sorted according to their corresponding height of the cow and this is shown as a function of the percent of pixels corresponding to the cow height between 90 cm and a predetermined height above 90 cm or the total height of the cow. In FIG. 8 this distribution or area determination is shown for a cow of a maximum height of 130 cM indicated by the graph 'height', where the graph illustrates the percentage of pixels below a certain height of the cow but above 90 cM from the floor. It can be seen that about 40 percent of the pixels (in the range above 90 cm) are located beneath 120 cm.

d) Step 2c—Further analysis of data from Step 2b: From the distribution of heights as determined in step 2b a 80% quantile height was determined as 80% of the maximum cow height. This graph is shown as '80%'. The maximum cow height was determined as an average of the value of the 50 pixels indicating the tallest locations of the cow. In the example with the data in FIG. 8 the maximum height is 130 cM and the 80% quantile is 104 cM. The area below the graph '80%' and above 90 cM was determined.

e) Step 3: Determination of a delimitation of a contour plane for the pixels located higher than a cow height corresponding to the 80% quantile height subtracted 8 cM. The area within this contour line was determined. In the example with the data in FIG. 8 the contour plane is determined at a cow height of 104 cM–8 cM=96 cM. The area is determined as the area below the graph '80%–8 cM' and above 90 cM.

f) Step 4: Determination of a delimitation of a contour plane for the pixels located higher than a cow height corresponding to the 80% quantile height subtracted 2 cM. The area within this contour line was determined. In the example with the date in FIG. 8 the contour plane is determined at a cow height of 104 cM–2 cM=102 cM. The area is determined as the area below the graph '80%–2 cM' and above 90 cM.

g) Step 5: Determination of the points in the images corresponding to the location of the outer part of the hip bones which was defined as the location in the image where the contour plane determined in step 3 is widest. An virtual ? arbitrary triangle was made based on the location of the left and right hip bones and the tail head as determined in step 1 and in this triangle the angle at the tail head was determined as well as the distance between the left and right hip bones.

h) Step 6: Determining the maximum width in the transversal direction of the cow and at the location where the cow is widest and calculating a height profile along the maximum width i.e. a transversal height profile.

Analysis of the Data

The data obtained as described in the eight items above was converted to data making it possible to perform statistical analysis.

The contour planes determined in steps 2a (90 cM height), 2c (80% quantile height) and 4 (80% quantile height minus 2 cM) were transformed into thickness profiles. Such thickness profiles have different lengths between cows as the length of the cows differs and therefore the thickness profile of each cow was rescaled to a fixed length of 100 pixels. In a similar way the longitudinal height profile of step 1 was rescaled to a fixed length of 100 pixels. The transversal height profile of step 6 was rescaled to a fixed length of 40 pixels. Rescaling was performed as a simple proportion calculation based on the actual cow length or width and a length of 100 (or 40 if 40 pixels are the rescaling dimension) hereby a value $Z_n$ for a cow of a length 80 cM is rescaled by $(Z_n/80) \times 100 = 1.25\, Z_n$ or if $Z_m$ is for a cow of a length 115 cM the $Z_m$-value is rescaled to $(Z_m/115) \times 100 = 0.87\, Z_m$.

The entire data set for each image at this stage comprised 449 variables:

1. The area determined within the 90 cM contour line as described in step 2a (1 variable)
2. The area determined within the contour line delimited by the 80% quantile height as described in step 3 (1 variable)
3. The area determined within the contour line delimited by the 80% quantile height minus 2 cM as described in step 4 (1 variable)
4. The 80% quantile height (1 variable)
5. The angle between the lines from the tail head to the right and left hip bone as described in step 5 (1 variable)
6. The maximum width as described in step 6 (1 variable)
7. The length of the contour line determined at the cow's height of 90 cm as described in step 2a (and step 1) (1 variable)
8. The length of the contour line delimited by the 80% quantile height as described in step 3 (1 variable)
9. The length of the contour line delimited by the 80% quantile height minus 2 cM as described in step 4 (1 variable)
10. The thickness profiles at the cow's height of 90 cm rescaled to 100 pixels (100 variables) and illustrated in FIGS. 9A and 10A.
11. The thickness profiles at the cow's height determined at the 80% quantile height as described in step 3 and rescaled to 100 pixels (100 variables) and illustrated in FIGS. 9B and 10B.
12. The thickness profiles at the cow's height determined at the 80% quantile height minus 2 cM as described in step 4 and rescaled to 100 pixels (100 variables) and illustrated in FIGS. 9C and 10C.
13. The height profile in the longitudinal direction as described in step 1 and rescaled to 100 pixels (100 variables) and illustrated in FIGS. 9D and 10D.
14. The height profile along the maximum width as described in step 6 and rescaled to 40 pixels (40 variables) and illustrated in FIG. 11.

To further compress the data a 6 PCA model (PCA=principal component analysis) was developed with up to 15 principal components (PC scores) for each data set (feature set) with the following combination of data and where the variable number refers to the list above:
    a) Variable 1 to 9 (9 PC scores)
    b) Variable 7+10 (15 PC scores)
    c) Variable 8+11 (15 PC scores)
    d) Variable 9+12 (15 PC scores)
    e) Variable 10+13 (15 PC scores)
    f) Variable 11+14 (15 PC scores)

The person skilled in the art knows how to perform a principal component analysis, and this will not be further described.

The original lengths of the curves were included in the calculation of the PC scores hereby the knowledge of the length of the individual cow was maintained.

With the PC scores a total of 449 variables were reduced to 85 variables.

Identification of the Individual Cow

The sequence of numbers i.e. the PC scores for a cow to be identified was compared to the average feature PC of each of the cows in the herd. A cow was identified when the average feature PC for this cow resembled an average feature PC calculated for one cow more than it resembled average feature PCs calculated for the other cows in the herd. In practice the calculation was performed by creating the dot product between each average vector $X_k$ for each cow 'k' in the herd and the vector $X_u$ for the un-identified cow i.e. the cow to be identified:

$$\cos(v_k) = \frac{\vec{X_k} \cdot \vec{X_u}}{|\vec{X_k}||\vec{X_u}|}$$

where $v_k$ is the angle between the two vectors $\vec{X_k}$ and $\vec{X_u}$, and $|\vec{X_k}|$ and $|\vec{X_u}|$ are the length of each of the vectors. If the vector for an un-identified cow resemble a vector for a cow in the herd then $\cos(v_k)$ will be close to +1 (plus 1), whereas if these two cows are very different $\cos(v_k)$ will be close to −1 (minus 1).

The shown model for analysis is very simple and over fitting is nearly unlikely. The model can be extended and improved ongoing as more pictures are obtained for each cow. It is also simple to identify deficient images and avoid the use of these for identification of a cow or when extending the calculation of an average vector for each of the cows.

The method as described above was tested with 9 principal components for features indicated under item a) in the list above and either 15, 14, 13, 12, 11, 10, 9, 8, 7 or 6 principal components for each of the remaining features indicated under item b) to f) in the list above. The best result was obtained by using 9 scores for features of item a) and 7 scores for each of the features of item b) to f).

The analysis as described in example 2 was performed for about 5 images for each cow representing in total 27 cows, in total 137 images. The images representing one cow were obtained at different times of the day and at different days. Of the 137 images 116 were immediately correctly connected to the right cow when using 9 scores for features of item a) and 7 scores for each of the features indicated under item b) to f) in the list above. When making an average of the 5-6 images obtained for each cow although obtained at different days the identification of all of the cows were correct. Extending the analysis to be based on more features obtained from the images and/or from features obtained from more than one image of a cow where the images are obtained e.g. with a very short time span e.g. of 0.1-1 e.g. 0.5 seconds would make sure the correct identification is performed.

Further Details

1. A method for determining the identity of an individual animal from the natural appearance and/or topology of the back of said animal, said method comprising
    Obtaining at least one image of the back of an un-identified animal,
    Extracting data from said at least one obtained image, said extracted data relating to the natural appearance and/or topology of the back of the animal,
    Comparing said extracted data extracted from at least one image of an un-identified animal with reference data extracted from at least one reference image of a back of an identified animal where information of the identity of the identified animal is connected to said at least one reference image, and
    Determining based on said comparing whether said un-identified animal corresponds to said identified animal.

2. The method according to item 1 wherein at least one reference image of the back of an identified animal is obtained at least once a month, preferable the reference image is obtained at least every second day, more preferable the reference image is obtained at least once a day and/or said animal is selected from the group of cattle, cows, dairy cows, bulls, calves, pigs, sows, boars, castrated males, piglets, horses, sheep, goats, deer.

3. The method according to any of the items 1 to 2 wherein said at least one reference image of the back of an identified animal is obtained by
    providing the identification number of an animal, hereby the animal being an identified animal,
    providing at least one image of the back of said identified animal, and
    storing in a database said identification number of the identified animal together with said at least one image of the back of said identified animal said image hereby being a reference image.

4. The method according to any of the items 1 to 3 wherein said image and said reference image are topographic images of the back of the animals, such as 3D images e.g. multiple layers of 3D-images.

5. The method according to any of the items 1 to 4 wherein said comparing of extracted data extracted from said image with extracted data extracted from said reference image is performed by comparing at least one feature and/or at least one feature vector obtained from the said image with a corresponding feature and/or feature vector obtained from said reference images, such features and/or feature vector may comprise or be based on values of the area of multiple layers of said 3D-image and/or values selected from the group of topographic profile of the animal, such as the height of the animal, the broadness of the animal, contour line along the backbone of the animal, the length of the back, contour plots for different heights of the animal, volume of the animal above different heights of the animal, size of cavities, depth of cavities, the distance between two pre-selected points at the animal, where said pre-selected points may be selected from the group of right hip, left hip, right shoulder, left shoulder, tail head, neck, (1) left forerib, (2) left short rib start, (3) left hook start, (4) left hook anterior midpoint; (5) left hook, (6) left hook posterior midpoint, (7) left hook end, (8) left thurl, (9) left pin, (10) left tail head nadir, (11) left tail head junction, (12) tail, (13) right tail head junction, (14) right tail head nadir, (15) right pin, (16) right thurl, (17) right hook end, (18) right hook posterior midpoint, (19) right hook, (20) right hook anterior midpoint, (21) right hook start, (22) right short rib start, and (23).

6. A system for determining the identity of an individual animal from the natural appearance and/or topology of the back of said animal, said system comprising
   at least one camera for obtaining at least one image of the back of an un-identified animal,
   at least one database or admission to at least one database for storing data related to at least one reference image of the back of an identified animal and for storing data related to at least one image of the back of an un-identified animal,
   data transmission means for transmitting data from said at least one camera to said database,
   at least one processing means connected to said database, said processing means being configured for comparing extracted data from said at least one image from an un-identified animal with extracted data from at least one reference image where said extracted data is related to the natural appearance and/or topology of the back of the animal and based on this comparing determine whether said un-identified animal corresponds to said identified animal.

7. A system for determining the identity of an individual animal from the natural appearance and/or topology of the back of said animal, said system comprising
   A reference imaging unit for providing reference images of at least one identified animal, said reference imaging unit comprising
      i. at least one identity determining device for determining the identity of said identified animal,
      ii. at least one camera for obtaining at least one image of the back of said identified animal,
      iii. at least one database or admission to at least one database for storing at least information of identity of at least one identified animal and at least one image of the back of said identified animal,
      iv. data transmission means for transmitting data from said identity determining device and said camera to said database,
   An imaging unit configured for obtaining at least one image of the back of at least one un-identified animal, where said imaging unit is connected to said database for transmission of data from said imaging unit to said database,
   At least one processing means connected to said database, said processing means being configured for comparing extracted data from said at least one image from an un-identified animal with extracted data from at least one reference image where said extracted data is related to the natural appearance and/or topology of the back of the animal and based on this comparing determine whether said un-identified animal corresponds to said identified animal.

8. The system according to item 7, wherein said image is a 3D image and said reference image is a reference 3D image and/or said at least one camera of said reference imaging unit and said imaging unit each is one or more cameras selected from the group of range cameras, stereo cameras, time-of-flight cameras such as a range camera comprising a depth sensor and a 2D camera, such as a RGB camera and/or.

9. The system according to any of the items 7 to 8 wherein said camera of said reference imaging unit is activated to obtain an image of the animals back when an animal is close to said identity determining device and the identity of the animal has been registered.

10. The system according to any of the items 7 to 9 wherein said database stores multiple reference images of a single animal such as multiple reference images of a single animal from each day.

11. The system according to any of the items 7 to 10 wherein said processing means determine feature vectors of an animal for preselected distances calculated from the distance from the ground or floor and/or said feature vectors are areas of layers of 3D-images and/or said preselected distances are between 70 and 180 cm.

12. The system according to any of the items 7 to 11 further comprising means for determining feed consumption of at least one of said animal such as
   a feeding area imaging unit for providing images of a feeding area,
   processing means configured for assessing the amount of feed consumed by each identified animal by determining the reduction of feed in subsequent images of the feeding area in front of each identified animal.

13. The system according to item 12 wherein said feeding area imaging unit is said imaging unit for obtaining at least one image of the back of at least one un-identified animal such that said imaging unit obtains images of the back of at least one un-identified animal as well as of a feeding area.

14. The system according to any of the items 12 to 13 wherein feed consumption is determined from at least two images of the same feeding area and feed reduction is calculated as the difference of feed volume between the at least two images.

15. The system according to any of the items 12 to 14 wherein the imaging unit is configured for continuously imaging at least a part of a feeding area.

The invention claimed is:

1. A method for determining the identity of an individual livestock animal in a population of livestock animals with known identity, the method comprising the steps of:
   acquiring at least one 3D image of the back of a preselected livestock animal;
   extracting data from said at least one 3D image, said extracted data relating to the anatomy of the back and/or topology of the back of the preselected livestock animal; and
   comparing and/or matching said extracted data against reference data corresponding to the anatomy of the back and/or topology of the back of the livestock animals with known identity, thereby determining the identity of the preselected animal,
   wherein said reference data are extracted from at least one reference 3D image acquired of the back of each of the livestock animals in the population of livestock animals, and wherein at least one reference 3D image of the back of an identified animal with known identity is obtained at least once a month.

2. The method according to claim 1, wherein said at least one reference 3D image of the back of an identified animal is obtained at least every second week, or at least once a week, or at least twice a week, or at least three times a week, or at least every second day, or at least once a day, or at least twice a day.

3. The method according to claim 1, wherein said livestock animal is selected from the group of cattle, cows, dairy cows, bulls, calves, pigs, sows, boars, castrated males, piglets, horses, sheep, goats, deer, and/or wherein said population of livestock animals is a population of animals of the same type, breed and/or race selected from the group of cattle, cows, dairy cows, bulls, calves, pigs, sows, boars, castrated males, piglets, horses, sheep, goats, deer.

4. The method according to claim 1, wherein the extracted data and the reference data comprise values selected from the group of topographic profiles of the livestock animals.

5. The method according to claim 4, wherein the topographic profiles are selected from the group of: the height of the animal, the broadness of the animal, contour line along the backbone of the animal, the length of the back, contour plots for different heights of the animal, volume of the animal above different heights of the animal, size of cavities, depth of cavities, the distance between two pre-selected points at the animal, where said pre-selected points may be selected from the group of right hip, left hip, right shoulder, left shoulder, tail head, neck, left forerib, left short rib start, left hook start, left hook anterior midpoint; left hook, left hook posterior midpoint, left hook end, left thurl, left pin, left tail head nadir, left tail head junction, tail, right tail head junction, right tail head nadir, right pin, right thurl, right hook end, right hook posterior midpoint, right hook, right hook anterior midpoint, right hook start, right short rib start.

6. The method according to claim 1, wherein the extracted data and the reference data comprise at least one feature and/or at least one feature vector.

7. The method according to claim 6, wherein said at least one feature and/or at least one feature vector relates to a characteristic feature of the back of the animal.

8. The method according to claim 1, wherein said at least one reference 3D image of a livestock animal is obtained by concurrently determining the identity of the livestock animal by reading an identification marker attached to said livestock animal.

9. The method according to claim 1, wherein said 3D image and/or said reference 3D image is a topographic image of the back of the livestock animals.

10. The method according to claim 9, wherein said topographic image is a 3D image and/or multiple layers of 3D-images.

11. The method according to claim 1, wherein the extracted data and the reference data comprise at least one feature and/or at least one feature vector based on values of the area of multiple layers of said 3D-image.

12. The method according to claim 1, wherein the extracted data and the reference data comprise at least one feature vector for preselected distances calculated from the distance from the ground or floor supporting the livestock animals.

13. The method according to claim 12, wherein said preselected distances are between 70 and 180 cm.

14. The method according to claim 1, further comprising the step of determining the feed consumption of said identified preselected livestock animal.

15. A system for determining the identity of an individual livestock animal among a population of livestock animals with known identity, the system comprising:
- an imaging system configured for acquiring at least one 3D image of the back of a preselected livestock animal;
- a processing unit configured for:
  - extracting data from said at least one 3D image, said extracted data relating to the anatomy of the back and/or topology of the back of the preselected livestock animal, and
  - matching said extracted data to reference data corresponding to the anatomy of the back and/or topology of the back of each of the livestock animals with known identity, thereby determining the identity of the preselected livestock animal; and
- a reference imaging unit different and/or separate from the imaging system for providing one or more reference 3D images of an animal in the population of animals, said reference imaging unit comprising:
  - at least one identity determining device configured to determine the identity of said animal, and
  - at least one reference camera configured to acquire at least one reference 3D image of the back of said animal,
  - wherein the system is configured to associate the determined identity of the animal with said at least one reference 3D image acquired by said reference camera(s), and
- wherein said reference data are extracted from at least one reference 3D image acquired of the back of each of the livestock animals in the population of livestock animals.

16. The system according to claim 15, wherein the system is further configured to store said at least one 3D image as a reference 3D image.

17. The system according to claim 15, wherein said at least one identity determining device is configured to determine the identity of said livestock animal by reading at least one identification marker attached to said livestock animal.

18. The system according to claim 15, wherein said imaging system and/or said reference imaging unit comprises one or more cameras selected from the group of range cameras, stereo cameras, time-of-flight cameras, and a 2D camera comprising a depth sensor.

19. The system according to claim 15, wherein said reference imaging unit is configured to acquire at least one 3D image of the back of a livestock animal, when the identity of said livestock animal has been determined by said at least one identity determining device.

20. The system according to claim 15, wherein said reference imaging unit is configured to acquire at least one 3D image of the back of a livestock animal, and/or determine the identity of a livestock animal when said animal is within a predefined distance of said identity determining device.

21. The system according to claim 15, further comprising a feeding area imaging unit configured to acquire images of a feeding area in front of the identified preselected livestock animal.

22. The method according to claim 1, wherein said at least one reference 3D image of the back of an identified animal is obtained at least once a month when an animal passes a reference 3D image location where an identification number of said animal is associated with at least one reference 3D image of the back of said animal.

23. The method according to claim 1, wherein at least a part of a feeding area in a feeding area of the animal is acquired when acquiring said at least one 3D image of the back of a preselected livestock animal.

24. The method according to claim 23, wherein said at least one reference 3D image is acquired separate from the at least one 3D image acquired in the feeding area.

* * * * *